United States Patent
Wang

(10) Patent No.: US 11,140,159 B2
(45) Date of Patent: Oct. 5, 2021

(54) BIOMETRIC IDENTIFICATION AND VERIFICATION AMONG IOT DEVICES AND APPLICATIONS

(71) Applicant: VISA INTERNATIONAL SERVICE ASSOCIATION, San Francisco, CA (US)

(72) Inventor: Quan Wang, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 301 days.

(21) Appl. No.: 16/320,395

(22) PCT Filed: Aug. 30, 2016

(86) PCT No.: PCT/US2016/049522
§ 371 (c)(1),
(2) Date: Jan. 24, 2019

(87) PCT Pub. No.: WO2018/044282
PCT Pub. Date: Mar. 8, 2018

(65) Prior Publication Data
US 2019/0268332 A1 Aug. 29, 2019

(51) Int. Cl.
*H04L 29/06* (2006.01)
*H04L 9/32* (2006.01)
(Continued)

(52) U.S. Cl.
CPC .......... *H04L 63/0861* (2013.01); *G06F 21/32* (2013.01); *G06F 21/44* (2013.01);
(Continued)

(58) Field of Classification Search
CPC . H04L 63/0861; H04L 9/3231; H04L 9/3236; H04L 63/0815; H04L 2209/38;
(Continued)

(56) References Cited

U.S. PATENT DOCUMENTS

| 7,761,501 B1 * | 7/2010 | O'Toole, Jr. ..... | H04N 21/83555 |
| | | | 709/203 |
| 8,843,997 B1 * | 9/2014 | Hare ................... | H04L 63/0815 |
| | | | 726/3 |

(Continued)

FOREIGN PATENT DOCUMENTS

| CN | 101984706 | 3/2011 |
| CN | 102857968 | 11/2014 |

(Continued)

OTHER PUBLICATIONS

"The Kerberos Network Authentication Service (V5)", Network working group, Request for Comments (RFC) 4120, Jul. 2005 (Year: 2005), 139 pages.*

(Continued)

*Primary Examiner* — Carl G Colin
*Assistant Examiner* — Zhe Liu
(74) *Attorney, Agent, or Firm* — Kilpatrick Townsend & Stockton LLP

(57) ABSTRACT

One embodiment of the invention is directed to a computer-implemented method comprising, receiving a first request that includes a token associated with a first computing device to utilize a shared resource implemented by a federated network of computing devices. The method further comprises identifying that the first computing device is an unknown entity based in part on the token and one or more signature used to sign the token. The method further comprises transmitting, to a trust management system, a second request to authenticate the first computing device using the token. The method further comprises, receiving an authentication message that verifies the first computing device within an open trust network. The authentication message may be generated in response to the trust management system communicating with a plurality of registrar comput- (Continued)

ers in the open trust network about the signatures associated with the token.

18 Claims, 8 Drawing Sheets

(51) Int. Cl.
| | |
|---|---|
| *H04W 4/02* | (2018.01) |
| *G06F 21/44* | (2013.01) |
| *H04W 12/06* | (2021.01) |
| *G06F 21/32* | (2013.01) |
| *H04W 4/70* | (2018.01) |

(52) U.S. Cl.
CPC .......... *H04L 9/3231* (2013.01); *H04L 9/3236* (2013.01); *H04L 63/0815* (2013.01); *H04W 4/02* (2013.01); *H04W 4/70* (2018.02); *H04W 12/06* (2013.01); *H04L 2209/38* (2013.01)

(58) Field of Classification Search
CPC ......... H04W 4/70; H04W 4/02; H04W 12/06; G06F 21/32; G06F 21/44
See application file for complete search history.

(56) References Cited

U.S. PATENT DOCUMENTS

| | | | |
|---|---|---|---|
| 9,516,035 B1* | 12/2016 | Moritz | H04L 63/0861 |
| 2003/0138135 A1* | 7/2003 | Chung | G06K 7/10346 382/119 |
| 2005/0063333 A1* | 3/2005 | Patron | H04W 12/084 370/329 |
| 2006/0021019 A1* | 1/2006 | Hinton | G06F 21/41 726/10 |
| 2006/0123472 A1 | 6/2006 | Schmidt et al. | |
| 2006/0149671 A1* | 7/2006 | Nix | G06Q 20/40 705/40 |
| 2006/0235795 A1* | 10/2006 | Johnson | G06Q 20/02 705/44 |
| 2007/0154016 A1 | 7/2007 | Nakhjiri et al. | |
| 2007/0169171 A1 | 7/2007 | Kumar et al. | |
| 2008/0072301 A1* | 3/2008 | Chia | H04L 63/0815 726/8 |
| 2009/0320103 A1* | 12/2009 | Veeraraghavan | G06F 21/335 726/4 |
| 2010/0228982 A1 | 9/2010 | Zhu et al. | |
| 2011/0145565 A1* | 6/2011 | Kol | H04L 9/3271 713/155 |
| 2013/0047218 A1 | 2/2013 | Smith et al. | |
| 2013/0125223 A1* | 5/2013 | Sorotokin | H04L 9/3213 726/6 |
| 2013/0247142 A1* | 9/2013 | Nishizawa | G06F 21/604 726/1 |
| 2013/0254119 A1* | 9/2013 | Hayhow | G06Q 20/341 705/71 |
| 2014/0101453 A1 | 4/2014 | Senthurpandi | |
| 2015/0007273 A1 | 1/2015 | Lin | |
| 2015/0135277 A1 | 5/2015 | Vij et al. | |
| 2015/0142968 A1 | 5/2015 | Bhagwat et al. | |
| 2015/0244690 A1 | 8/2015 | Mossbarger | |
| 2015/0332283 A1 | 11/2015 | Witchey | |
| 2015/0365403 A1* | 12/2015 | Counterman | H04L 9/30 726/9 |
| 2016/0205106 A1 | 7/2016 | Yacoub et al. | |
| 2016/0210626 A1 | 7/2016 | Ortiz et al. | |
| 2016/0269393 A1* | 9/2016 | Corella | G06F 21/33 |
| 2017/0272342 A1* | 9/2017 | Zessin | H04L 41/145 |
| 2017/0272419 A1* | 9/2017 | Kumar | H04L 63/0823 |
| 2018/0041487 A1 | 2/2018 | Wang | |
| 2018/0349819 A1* | 12/2018 | Cochrane | G06Q 10/06 |

FOREIGN PATENT DOCUMENTS

| | | |
|---|---|---|
| KR | 1020120120955 | 11/2012 |
| WO | 2015080553 | 6/2015 |
| WO | 2016128569 | 8/2016 |
| WO | 2018026488 | 2/2018 |

OTHER PUBLICATIONS

"Assertions and Protocol for the OASIS Security Assertion Markup Language (SAML)", OASIS Standard, Mar. 2005 (Year: 2005), 86 pages.*
Sacco, O., Breslin, J. G., & Decker, S. (Jul. 2013). Fine-grained trust assertions for privacy management in the social semantic web. In 2013 12th IEEE international conference on trust, security and privacy in computing and communications (pp. 218-225). IEEE. (Year: 2013).*
U.S. Appl. No. 16/256,607 , Non-Final Office Action, dated Apr. 30, 2020, 7 pages.
EP17837377.5 , "Extended European Search Report", dated Oct. 1, 2019, 11 pages.
EP16915363.2 , "Extended European Search Report", dated Aug. 6, 2019, 8 pages.
EP17837377.5 , "Partial Supplementary European Search report", dated Jun. 18, 2019, 9 pages.
U.S. Appl. No. 15/229,041 , "Non-Final Office Action", dated Mar. 9, 2018, 9 pages.
U.S. Appl. No. 15/229,041 , "Notice of Allowance", dated Nov. 1, 2018, 9 pages.
Desai et al., "Semantic Gateway as Service Architecture for IoT Interoperability", Kno.e.sis Publications, 2015, 17 pages.
Katusic et al., "Universal Identification Scheme in Machine-to-Machine Systems", Faculty of Electrical Engineering and Computing, Department of Telecommunications, 8 pages.
PCT/US2016/049522 , "International Search Report and Written Opinion", dated May 30, 2017, 10 pages.
PCT/US2017/041863 , "International Search Report and Written Opinion", dated Oct. 23, 2017, 15 pages.

* cited by examiner

BIOMETRIC IDENTIFICATION AND VERIFICATION AMONG IOT DEVICES AND APPLICATIONS

CROSS REFERENCE TO RELATED APPLICATIONS

This application is the US national stage of PCT/2016/049522, filed Aug. 30, 2016, the disclosure of which is incorporated herein by reference in its entirety.

BACKGROUND

Advances in network technology and computer device technology allow for users to connect or communicate via the internet with a variety of devices. For example, a user may send images from their mobile phone to another user via the Internet. As another example, a user may place an order for milk via a user interface associated with their refrigerator. However, current solutions for providing a communication gateway support limited communication between similar technologies or devices (e.g., an application of a particular brand of smart phone can only communicate with the same application on another similar brand smart phone). Further, security vulnerabilities need to be overcome and protocols established before communication can be allowed between devices that are not operating within the same network. Moreover, current technologies for communication between Internet of Things (IoT) devices fail to include proper authentication procedures. For example, devices receiving communication requests or transaction requests currently lack the ability to verify the trustworthiness of the originating device and/or user before accepting such a request. Without verifying a device and/or user before accepting a communication request, a user may leave their device or themselves open to attack by fraudsters. An untrusted device may hijack a wireless network to perform operations such as illegally downloading media files. Furthermore, fraudsters who gain access to a network may attempt to mask themselves as a trusted member within a network thereby gaining access to other devices, applications, or shared resources within the network without the need to communicate with another network of devices. These drawbacks may lead to users not accepting any communication requests and failing to utilize their IoT device's hardware and software capabilities. Without a way to verify devices and/or users within a network, let alone devices attempting to communicate from another network, IoT devices will be unable to talk or communicate in a meaningful way that will be of user to a user.

Embodiments of the invention address these and other problems, individually and collectively.

BRIEF SUMMARY

Embodiments of the invention are directed to systems and methods related to establishing and proliferating a trust relationship among federated networks of computing devices and establishing a secure connection between devices associated with the federated networks of computing devices. Embodiments of the invention are further directed to systems and methods for authenticating transactions among Internet of Things (IoT) devices using biometric information and for granting access to shared resources that are shared by a host. Proliferating a trust relationship among federated networks of computing devices may include establishing trust with each device and/or user within a network prior to communicating with other networks. For example, each device within a federated network may undergo a biometric authentication operation prior to communicating, via a registrar computer system, with another device within the same federated network or with another device within another federated network. Biometric templates of users associated with various IoT devices may be obtained by a registrar computer, maintained, and proliferated to other trusted members within an open trust network. In some embodiments, the biometric templates may be obtained and established during a registration step. In embodiments, a biometric authentication operation may occur within a federated network to establish trusts within a first network of computing devices before the device and/or user are allowed to communicate with a second network of computing devices. For example, a user may interact with a first IoT device to provide a biometric sample or biometric information (i.e., a retina scan) which may be compared to a biometric template for the user to verify or authenticate the device and/or user within a first federated network before a communication request can even be generated for communicating with a second federated network. By enforcing a biometric authentication operation, members of an open trust network can benefit from a redundant security check that includes a device first authenticating itself within its own federated network before communication is allowed with another trusted member. Further security benefits are gained by establishing policies that identify a certain number of signatures or certain entities that need to sign a token provided by a communicating party before communication is established between two members in an open trust network, as described herein.

Current systems lack a method for establishing trust between federated networks of computing devices. Current systems also lack method for forming a trusted open network that allows for various voting structures to allow communication within the open network and to add new members to the open network. No protocol currently exists to provide a means for locating devices that wish to be communicated with or how to communicate with said devices. Currently, users rely on a particular application being configured to communicate across devices and even then trust must may be limited to a few devices owned by a particular user. Thus, if a user wishes to communicate with a device that is not pre-configured for a particular application and/or not already trusted by their own federated network, the user is unable to perform the desired communication and interaction operations. Current manufacturers of smart devices (smart phones, smart cars, wearable device, etc.) fail to enable partnerships or integration between device types or brands. Further, hardware constraints may impose problems that are difficult to overcome without a shared protocol and communication channel.

Thus, there is a need for new and enhanced systems and methods of establishing and proliferating a protocol for establishing trust between entities in an open network and establishing a hierarchical addressing scheme to allow communication between applications residing on various Internet of Things (IoT) devices. Efficient communication and authentication for transactions conducted using IoT devices within various federated network of computing devices can be achieved utilizing the standard and verifying tokens based on signatures used to sign the token provided during a transaction.

One embodiment of the invention is directed to a computer-implemented method comprising, receiving, by a server computer and from a first registrar computer system in a first federated network of computing devices, a request to authenticate a first computing device being utilized to conduct a transaction in the first federated network of computing devices, the request including a token that is signed by an entity residing in a second federated network of computing devices. The token may include biometric information of a user for the transaction. The computer-implemented method further comprises identifying, by the server computer, a canonical address for communicating with a second registrar computer system associated with the entity. The computer-implemented method further comprises transmitting, by the server computer, the authentication request from the first registrar computer system to the second registrar computer system using the canonical address. The computer-implemented method further comprises receiving, by the server computer and from the second registrar computer system, a confirmation of the authentication request, the confirmation determined by the second registrar computer system based in part on the biometric information of the user and the signature of the token by the entity. The computer-implemented method further comprises transmitting, by the server computer and to the first registrar computer system, the confirmation of the authentication request including the token. The token may be signed by the first registrar computer system and provided to the first computing device for use in subsequent transactions in the first federated network of computing devices.

In some embodiments, the canonical address represents an overall address for a hierarchy of addresses associated with the first federated network of computing devices. In embodiments, the first banking entity may maintain template biometric information for verifying the biometric information of the user. In some embodiments, the confirmation of the authentication request is determined further based in part on a plurality of policies maintained by the merchant registrar computer. In various embodiments, the plurality of policies identify a number of signatures from one or more members of an open trust network for authenticating the request.

One embodiment of the invention is directed to a computer-implemented method comprising receiving, by a registrar computer system associated with a federated network of computing devices, a first request to utilize a shared resource implemented by the federated network of computing devices. The first request may be provided by a first computing device and include a token associated with the first computing device. The computer-implemented method further comprises identifying, by the registrar computer system, that the first computing device is an unknown entity based at least in part on the token and one or more signatures used to sign the token and a policy associated with the one or more signatures specified by the registrar computer system. The computer-implemented method further comprises transmitting, by the registrar computer system to a trust management system, a second request to authenticate the first computing device, the second request including the token. The computer-implemented method further comprises receiving, by the registrar computer system from the trust management system, an authentication message that verifies the first computing device within an open trust network, the authentication message generated by the trust management system in response to the trust management system communicating with a plurality of registrar computers in the open trust network to determine signatures provided by the plurality of registrar computers for the token. The signatures may represent previous transactions with the first computing device and the token in respective federated networks of computing devices that correspond to the plurality of registrar computers. The computer-implemented method further comprises enabling, by the registrar computer to the first computing device, access to the shared resource by at least providing the token and location information for the shared resources to the first computing device. The token may be signed by the registrar computer and the location information includes a canonical address for communicating with the shared resource.

In some embodiments, the shared resource comprises one or more of a mobile computing device, a wearable device, a laptop computer, a desktop computer, a server computer, an automobile, a printer, a scanner, a wireless router, a wireless network, a software application, a storage device, or a computer resource made available by a host. In various embodiments, the computer-implemented method further comprises updating, by the trust management system, a mapping of known entities for the registrar computer system in response to enabling access to the shared resource by the registrar computer. In some embodiments, the computer-implemented method further comprises receiving, by the registrar computer system from another registrar computer system, an indication that a prior authentication has been performed within another federated network of computing devices associated with the other registrar computer system, the prior authentication may be performed by the first computing device using the biometric information. In various embodiments, the signatures provided by the plurality of registrar computers for the token are signed using respective private keys that are generated and maintained by the plurality of registrar computers.

In some embodiments, the federated network of computing devices represents a federated block chain. In embodiments the token associated with the first computing device is generated using a hashing algorithm that utilizes the biometric information and a private key maintained by a corresponding network of computing devices associated with the first computing device. In various embodiments, the signatures provided by the plurality of registrar computers for the token represent successfully authenticated transactions within the respective federated networks of computing devices utilizing the first computing device and the token.

Embodiments of the invention are further directed to a server computer comprising a processor and memory. The memory can include instructions that, when executed with the processor, cause the server computer to perform operations for implementing any of the methods described herein. In some embodiments, a particular member of the open trust network is a banking entity associated with a banking entity computer system. The banking entity computer system is configured to capture behavior information and environment information for transactions conducted by the user. In various embodiments, the banking entity computer system is further configured to generate one or more identity profiles based in part on the behavior information and the environment information, the one or more identity profiles may be associated with the user. In some embodiments, the banking entity computer system is further configured to generate a plurality of tokens, each token corresponding to a token type and based in part on a particular identity profile of the one or more identity profiles associated with the user. In embodiments, the registrar computer system confirms the authentication request based at least in part on the token type associated with the token and the signature of the token. In various embodiments, the registrar computer system maintains one or more policies identifying the token type to authenticate based on a type of transaction.

These and other embodiments of the invention are described in further detail below.

DETAILED DESCRIPTION

Figure 1:
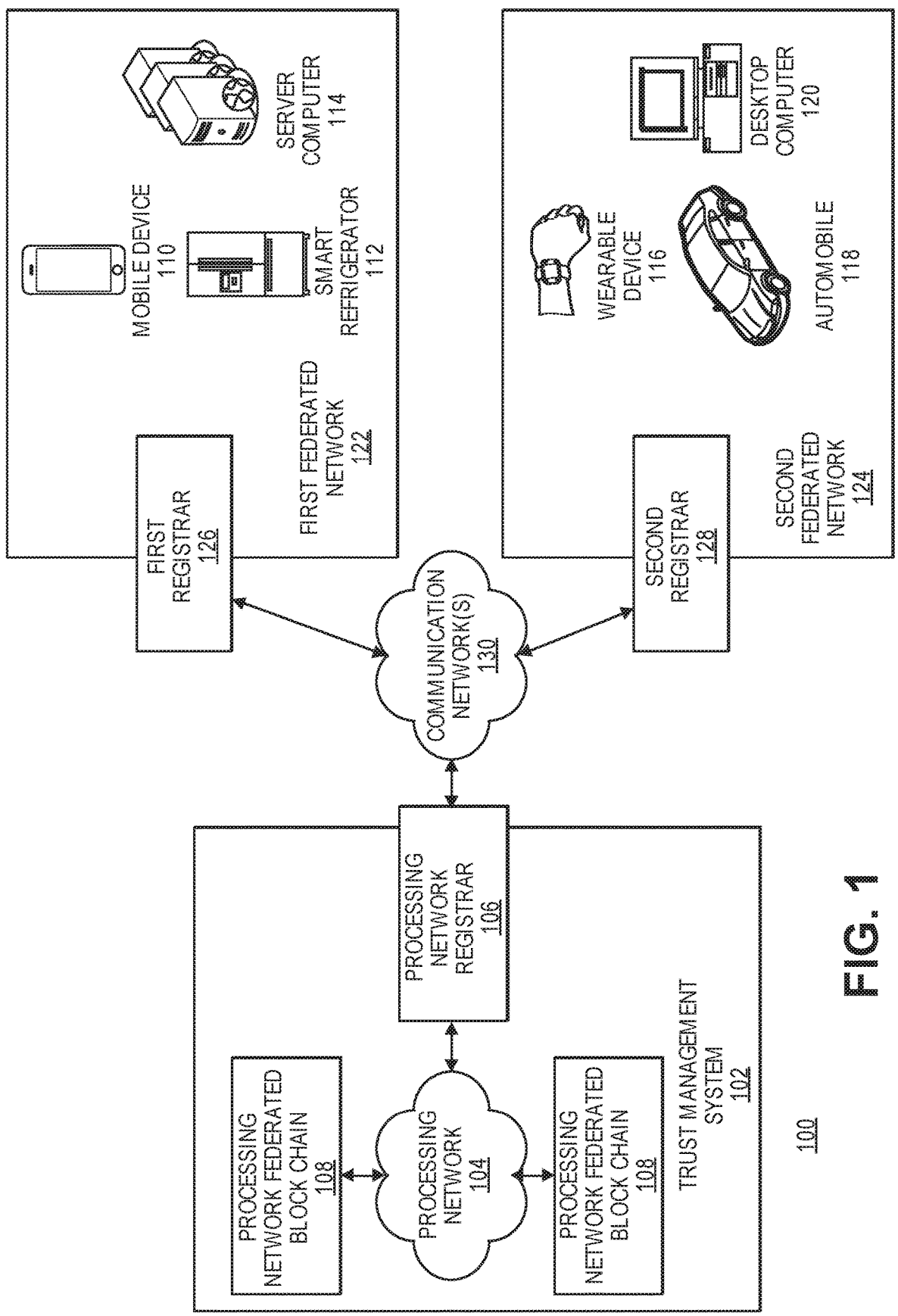
FIG. 1 depicts an example system architecture capable of implementing at least some embodiments of the current disclosure.

Embodiments of the present invention may be directed to systems and methods related to establishing and proliferating a trust relationship among federated networks of computing devices and establishing a secure connection between devices associated with the federated networks of computing devices. Embodiments of the invention are further directed to systems and methods for authenticating transactions among Internet of Things (IoT) devices using biometric information and for granting access to shared resources that are shared by a host.

In some embodiments, trust may be established between one or more federated networks of computing devices to allow an connection to be established between IoT devices residing in different networks. For example, an open trust network may be established that is managed by a trust management system for proliferating a protocol of trust establishment, signaling, and communication between the federated networks of computing devices. An IoT device residing in one federated network of computing devices may attempt to establish a connection to another IoT device residing in another federated network of computing devices by first establishing trust between the two federated networks of computing devices. In some embodiments, the IoT devices may send communication requests or other data communications via a registrar computer associated with each federated network of computing devices. Prior to allowing and enabling communication among IoT devices trust is established. In embodiments, each federated network of computing devices may utilize a different voting structure to ratify or verify decisions, such as whether to trust a communication request from another device. Example voting structures may include a block chain voting structure, a tree voting structure, or any suitable hybrid of voting structures known in the art. In some embodiments, each IoT device, user, or entity represented in each federated network of computing devices may provide input according to the utilized voting structure to establish trust in the open trust network.

In embodiments, voting and trust include verifying a credential or electronic identification (EID) for each entity included in a transaction or communication request. Multiple levels of trust may be established and verified before communications can occur between entities in the open trust network. For example, communication among IoT devices within a federated network of computer resources may occur upon verifying the signatures or "votes" associated with an EID or other credential communicated between IoT devices. As an illustrative example, a smart refrigerator may receive a communication request from a smart watch (wearable device). The smart refrigerator and the smart watch are both included in the same federated network of computer resources. The smart refrigerator may communicate with an associated operator (such as the corresponding registrar) to query the identity and apply a policy that verifies and authenticates the communication from the smart watch. For example, the registrar may maintain or identify one or more signatures that are provided by other entities (i.e., IoT devices) within the federated network for the credential that was provided by the smart watch. Other IoT devices within the federated network of computer resources may have previously encountered and trusted (signed or provided signatures) the smart watch and enabled communication.

In embodiments, each signature or vote may carry a certain weight that factors into the overall determination of whether to authenticate and verify an entity and establish communication. The registrar may maintain one or more policies for each IoT device that establishes a minimum signature or vote limit that is met before communication can be established. For example, a policy may require that a credential have been previously signed by three other trusted entities within the federated network before a device associated with the federated network may be communicated with by other entities within the open trust network. Once trust has been established, communication can occur between the IoT devices. Further, the registrar may update the credential or EID provided by the smart watch to indicate that the smart refrigerator has verified and signed the EID. Signatures discussed herein refer to utilizing a private key that is associated with each entity or IoT device.

In embodiments, an IoT device from a first federated network may attempt to communicate with an IoT device from a second federated network. As discussed herein, locating and communicating with IoT devices of different federated networks uses a hierarchical addressing schema that is maintained by a corresponding registrar. A hierarchical addressing schema may be utilized with an IPV6 header to avoid the flat addressing schema utilized in conventional blockchain configurations. Once a communication request has been received, similar operations as those discussed above are used to determine trust. In some embodiments, a registrar that receives a communication on behalf of an IoT device from another registrar may identify appropriate polices (i.e., identify a threshold amount of signatures) and query other entities in the open trust network (i.e., other registrars) to determine trust. For example, a given registrar may determine that a communication request from a particular federated network of computer resources is to be trusted or signed by two bank organizations and one government organization before trust can be established. In embodiments, the registrar may identify the associated signatures of a provided EID via corresponding metadata or other suitable information for identifying private key signatures provided by entities. In various embodiments, a registrar may communicate with other registrars inquiring about the entity in question to determine trust.

For example, the registrar may query another registrar in the open trust network and/or a processing network registrar, by providing the EID and requesting whether the other members of the open trust network have previously signed the EID. As discussed herein, each entity in the open trust network is given a weighted value or factor that is associated with their signing of a given EID. For example, a bank institution signature may carry greater weight in a trust determination than a signature provided by a private individual. Maintained policies may require a number of entities with a given weight value or factor provide votes or signatures for a given EID prior to establishing trust. Once trust has been established, a corresponding registrar may provide a token that includes addressing information that allows for communication between IoT devices of different federated networks of computing devices. Further, the registrar may update a list of trusted entities, signatures provided to said entities, and contact information for a trusted federated network of computer resources. Signaling between IoT devices includes utilizing a hierarchical addressing scheme that maintains a unique address for each IoT device and associated applications without overloading or running out of available addresses, as discussed herein. In embodiments, a user of an IoT device may specify the votes or signatures required before an entity will be trusted.

In embodiments, each member of the open trust network may be queried before establishing trust between two federated networks of computing devices or, in some embodiments, only the federated network of computing devices receiving requests may vote to establish trust. Each participating entity in a trust establishment decision may be assigned a weight or be given a certain number of votes regardless of the voting structure utilized within each participating federated network of computing devices. For example, one federated network of computing devices includes five IoT devices that utilize a block chain voting structure can provide a single vote that is given a certain weight towards a decision as similarly as another federated network of computing devices that includes only three IoT devices that utilizes a hybrid voting structure. Part of establishing trust between federated networks that are geographically remote includes locating a particular federated network and knowing how to address or communicate with said federated network. Current solutions fail to provide a way for one type of IoT device (i.e., a smart refrigerator) to locate and/or communicate with another type IoT device (i.e., a smart car). For example, a particular type of IoT device may only be configured to communicate with other IoT devices of the same type (i.e., a smart car to smart car communication). Embodiments disclosed herein provide a distributed entity (registrar) associated with each federated network of computing devices that may serve as a signaling hub that allows for federated networks of computing devices to locate each other and communicate with each other (including trust establishment requests).

Each registrar may be located by other registrars utilizing a unique canonical address that is part of a hierarchical addressing scheme. In some embodiments, the hierarchical addressing scheme refers to one or more addresses that are associated with and utilized by a federated network of computing devices. For example, the unique canonical address may be a transport internet protocol address that may be utilized to communicate between registrars. In embodiments, a token may be generated by a registrar and provided to another registrar that includes other addressing information, such as a hashed device address or API address that corresponds to a particular IoT device of the federated network of computing devices or a particular application associated with the particular IoT device. In some embodiments, each IoT device and application may have a local address that is utilized when communicating within a federated network of computing devices. In embodiments, the registrar may generate and maintain a separate set of addresses for each IoT devices and application and mapping between the addresses for use by entities outside of their own federated network (i.e., addresses that can be utilized by IoT devices of another, remote, federated network of computing devices). The addresses that the registrar maintains and shares with other registrars may be generated by utilizing a private-public key pair or by utilizing a hashing process. Embodiments may utilize the hierarchical addressing scheme to maintain security and allow for a uniform protocol to be proliferated and established between members of the open trust network. For example, the addresses maintained by the registrar may adhere to a particular set of rules or policies that is uniform across members of the open trust network to ensure that a particular IoT device can properly address and request communication across federated networks of computing devices.

In some embodiments, the trust establishment and communication process may be initiated by a user conducting a transaction in a particular environment for an item or service. In some embodiments, the process may be initiated by a user seeking to gain access to secure data or a secure area. In various embodiments, the trust establishment and communication process may be initiated by a user seeking to buy, rent, lease, or gain access to a shared resource. In some embodiments, a user may utilize their EID, token, and computing device to initiate a transaction or verify themselves at a location (and corresponding federated network of computing devices) without providing further input. In embodiments, a first registrar associated with a first federated network of computing devices may communicate with a trust management service to identify another member of the open trust network to communicate with an verify the user, EID, and token included in the transaction.

In various embodiments, the trust management service may provide the verification or authentication request to the appropriate entity as the trust management service maintains the location information for each member in the open trust network. In some embodiments, the first registrar may contact another registrar computer system associated with another member of the open trust network directly to authenticate the user and computing device being utilized in the transaction. In embodiments, the authentication request may include biometric information about the user, such as a biometric sample. The biometric sample may be previously captured and stored on the user's user device or a new sample may be taken at the time of conducting the transaction. A member of the open trust network that has previously interacted with the user and corresponding token and/or user device may maintain a biometric template for identification and verification purposes of authenticating the user. Thus, a member of the open trust network may verify signatures used to sign a token and biometric samples provided by a user before authenticating or verifying the user as a trusted and known entity within the open trust network. In embodiments, once an entity is known to a federated network of computing devices, the corresponding registrar may sign the token thereby enabling more efficient transaction processing for subsequent transactions conducted within the corresponding federated network of computing devices.

In some embodiments, a member of the open trust network, such as a banking entity, may obtain and/or capture environment information and behavior information associated with user's who conduct various transactions. The entities may be configured to utilize a context aware model that uses the environment and behavior information of a user to generate one or more identity profiles for a user. Each profile may indicate a potential aspect of a user when interacting in certain environments or conducting certain transactions. In various embodiments, the entities' corresponding registrar may generate a plurality of token types to represent the identity profiles generated for a user. When each token type is provided and/or requested during a transaction, the registrar may utilize a different set of policies that indicate a number and/or a type of signatures, biometric matching, etc., before a transaction can be authenticated. Entities may utilize the context aware model to provide an appropriate token type for use in a particular context, environment, and transaction thus providing for a more secure and efficient transaction authentication process. Further, by capturing behavior of a user, the token types and identity profiles can be more particularized and customized to each user thereby providing a more personal transaction authentication process. In some embodiments, the identity profiles may be generated based on biometric information, geo-location information such as global positioning satellite information of a user's device, usage information associated with a particular IoT device and/or an application of the IoT device, or transaction data associated with transactions conducted by the user utilizing a particular device or IoT device. In embodiments, an identity profile may be utilized to associate an IoT device or application with a token, EID and person.

Embodiments of the present disclosure provide several advantages. As discussed herein, currently there exists no established protocol for properly locating, addressing, and establishing trust between federated networks of computing devices that are comprised of computing devices or IoT devices. Further, federated networks do not have to update their voting structure to align with other entities voting structures as registrars can be utilized to communicate among federated networks that utilize different voting structures. Applications and devices that previously were unable to communicate let alone locate each other can now utilize the established protocol of communication via the registrar and hierarchical addressing scheme. Developers for IoT devices may only need to leverage API calls or requests according to the hierarchical addressing scheme to communicate and share data between IoT devices rather than maintaining a plurality of different addresses and communication methods to talk between IoT devices and applications. Security benefits may be gained as the hierarchical addressing scheme and trust establishment allows communication to the address maintained by each registrar and only after trust has been established. Thus, one entity may fail to obtain an actual device or network identifier. As such, implementation of the invention described herein may include advantages for the use of networking, software, and hardware capabilities of existing network and computer devices with minimal infrastructure modification.

Embodiments of the present invention may be used in transaction processing systems or may use data generated during transaction processing through a transaction processing system. Such embodiments may involve transactions between users and resource providers. Further, embodiments of the invention, as discussed herein, may be described as pertaining to financial transactions and payment systems. However, embodiments of the invention can also be used in other systems. For example, a transaction may be authorized for secure access of data or to a secure area. Embodiments of the present invention may be used in establishing a connection or communicating between IoT devices residing in different networks and/or federated networks. The different networks and/or federated networks may be geographically remote.

Prior to discussing embodiments of the invention, descriptions of some terms may be helpful in understanding embodiments of the invention.

"Biometric information" or "biometric data" includes data that can be utilized to uniquely identify an individual based upon one or more intrinsic physical or behavioral traits. For example, biometric data may include retinal scan and tracking data (i.e., eye movement and tracking where a user's eyes are focused). Further examples of biometric data include digital photographic data (e.g., facial recognition data), digital sound data (e.g., voice recognition data), deoxyribonucleic acid (DNA) data, palm print data, hand geometry data, and iris recognition data.

A "biometric template" can be a digital reference of characteristics that have been extracted from one or more biometric samples. In some embodiments, the biometric samples may be derived from social media content shared by or associated with a user. In some embodiments, a biometric template may be derived from biometric data. A biometric template as used herein includes biometric templates for revocable and non-revocable features associated with a user such as facial images and voice samples. Examples of non-revocable features associated with a user include a finger print. Biometric templates are used during the biometric authentication process. Data from a biometric sample provided by a user at the time of authentication can be compared against the biometric template to determine whether the provided biometric sample closely matches the biometric template.

A "shared resource" may include a computer resource made available from one host to other entities on a computer network. Examples of a shared resource may include a mobile computing device, a wearable device, a laptop computer, a desktop computer, a server computer, an automobile, a printer, a scanner, a wireless router, a wireless network, a software application, or a storage device.

An "identity profile" may include information that digitally represents the person's characteristics and attributes. For example, the identity profile may include "environment information," that further indicates a physical location, a preference for particular locations such as particular stores, venues, or areas, located in various physical locations, or computer networks that are interacted with by a corresponding user device. The identity profile may further include "behavior information" which may represent actions taken by a user in a particular location. Examples of behavior information may include a transaction type conducted, a monetary amount associated with a transaction type, an amount of time spent in a particular location, a preference for a particular transaction, a preference for a particular user device, or a preference for requesting access to a particular resource, such as a shared resource, within a location.

A "computer device" may comprise any suitable electronic device that may be operated by a user, which may also provide remote communication capabilities to a network. An "Internet of Things device" may be an example of a "computer device." An Internet of Things device may have a primary function that is unrelated to communicating with other Internet of Things devices or computers. For example, an Internet of Things device may be a refrigerator that, in addition to preserving food, is capable of interacting with one or more other Internet of Things devices. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of computer devices include mobile phones (e.g. cellular phones), PDAs, tablet computers, net books, laptop computers, personal music players, hand-held specialized readers, etc. Further examples of computer devices include wearable devices, such as smart watches, fitness bands, ankle bracelets, rings, earrings, etc., as well as automobiles with remote communication capabilities. In some embodiments, a computer device can function as a payment device (e.g., a computer device can store and be able to transmit payment credentials for a transaction). A "federated network of computing devices" may include one or more computer devices or Internet of Things devices that belong to a same network, entity, organization, or user. Each federated network of computing devices may utilize a voting scheme or structure.

A "registrar" or "registrar computer" may include computer hardware, software, and/or any suitable combination of both hardware and software for generating, maintaining, proliferating, and/or establishing a communication protocol between federated networks of computing devices. The registrar may be distributed between the federated networks of computing devices and also provide remote communication capabilities to a network. In some embodiments, the registrar may include one or more modules for communicating with other registrars and generating tokens for establishing communication among IoT devices. In embodiments, the registrar may request generation of a token by a particular IoT in an associated federated network of computing devices. In some embodiments, the registrar may store and maintain a hierarchical address scheme for one or more Internet of Things devices that correspond to an associated federated network of computer devices. The registrar may generate and maintain one or more tokens that identify authenticated Internet of Things devices in an associated network as well as tokens provided by other registrars of the open trust network. In embodiments, the registrar may include a data structure for obtaining and maintaining the above mentioned information.

A "trust management system" may include a system that operates based at least in part on trust. It may include one or more server computers for enabling communication between registrars, updating registrars with new contact and device information, and proliferating a communication protocol that includes a hierarchical addressing scheme. In embodiments, the trust management system may include may data processing subsystems, networks, and operations used to support and deliver authorization services, exception file services, and clearing and settlement services associated with transaction processing. In some embodiments, the trust management system may maintain membership in the open trust network. In embodiments, the trust management system may provide communication requests, responses, and tokens to registrars within the open trust network.

An "open trust network" may include a network that operates based at least in part on trust and open membership. It may include one or members that may join the open trust network upon requesting membership without any membership requirements or limitations (i.e., only federated networks of smart phone devices may join). In embodiments, a "member" of the open trust network represents a federated network of computing devices that adheres to the hierarchical and canonical address formatting scheme described herein and enforces a token signature and biometric sample verification operations described herein. In some embodiments, to join the open trust network, a vote may be held among the members of the open trust network with certain weights assigned to each entity. The votes are compared to a threshold to determine acceptance to the open trust network. In some embodiments, no vote is required to become a member of the open trust network. Instead, any communication or request from a previously unknown entity (federated network of computing devices) or known entity may be put to a vote to determine trust and establish trust between the entities in question. Each member of the open trust network may utilize their own voting structure or scheme (block-chain, hybrid, etc.) without modifying the voting structure of another member. An example of a block-chain voting structure may include a voting structure that require each member of the block-chain to vote or assent to a decision or action before the decision/action is allowed. An example of a tree voting structure may include a voting structure that only requires the assent of a certain number of entities within the association or network and follows a hierarchical tree structure. A hybrid voting structure may be any suitable combination of a block-chain, tree, or other suitable voting structure within a federated network of computing devices.

A "token" may be any data or portion of data used to provide information, such as unique address information, API information, location information, or registrar information. The token may be encrypted, digitally signed, or utilize any suitable security protocols to ensure privacy of information. In embodiments, the token may represent a container for information communicated between registrars in the open trust network and/or between Internet of Things devices that have established a secure connection (device and/or application information). In some embodiments, a token may be provided to an IoT device within a federated network of computing devices that includes a location identifier and API identifier upon registration with an associated registrar. A token may be generated by a registrar and provided to another registrar to enable communication between IoT devices residing in different federated networks of computing devices. The token may contain information for properly communicating between IoT devices (i.e., a smart phone and a smart car) according to the canonical addressing format described herein. In some embodiments, the token may contain other information such as requested information from an application, API calls, or API service requests from applications and APIs associated an IoT device. For example, after a secure connection has been established between IoT devices of different federated networks, one device may provide information regarding an application (such as transaction information or information provided by a user interacting with a particular application) utilizing a token. The addressing information obtained, via a token, may be utilized to establish a secure connection between IoT devices within an open trust network. In various embodiments, the token may include or be associated with biometric information of a user. The biometric information may be provided during an authentication and/or verification step prior to a communication or transaction request among IoT devices. The biometric template may be provided to a registrar computer during a registration operation by a user in communication with a registrar computer.

A registrar computer system associated with a member of the open trust network may generate and maintain one or more "token types" that represent a certain identity profile of a user. Each "token type" may be an example of a token with more or less information than another token type. In embodiments, a registrar computer system may associate one or more different polices for each token type that identify a particular number of signatures or an identity of particular entities required to sign a token before a transaction can be authorized. In embodiments, a token type may be representative of a user's environment and behavior within said environment when communicating with other IoT devices and/or when conducting transactions. For example, a user may exclusively utilize their smart phone to conduct monetary transactions with an online marketplace. A token type may be generated that reflects the nature of transactions conducted with the device (i.e., monetary transactions) and associated with a policy that reflects the sensitive nature of the transaction (i.e., high threshold of signatures and/or entities providing signatures for this particular token type given that it is a monetary transaction). Another token type and associated policy may be generated that reflects usage of a user with a smart watch's program that tracks exercise progress and regularly communicates with a networked database to maintain the progress (i.e., a low threshold of signatures and/or entities providing signatures for this particular token type given that it is merely a data transaction regarding exercise progress). In embodiments, token types may be associated with requesting entities such that when a request for a token is identified for or from that particular entity, a given token type is utilized (i.e., a first token type for communicating with a server versus another token type for communicating with smart refrigerators).

A "hierarchical addressing scheme" includes a canonical address format for each registrar in the open trust network that can be utilized to obtain other associated addresses from the registrar. In embodiments, a hierarchical addressing scheme may include a transport IP address that is associated with a registrar, a federated network address, a local IoT device identifier address, and an API identifier address. In embodiments, each IoT device, application, and federated network of computing devices may utilize the hierarchical addressing scheme and be assigned said addresses by the trust management system and/or an associated registrar. The hierarchical addressing scheme may utilize an overall address that represents an address that is presented or forward facing to members of an open trust network for communication purposes but actually represents one or more addresses included in the hierarchical addressing scheme.

An "access credential" may be any data or portion of data used to gain access to a particular resource. In some embodiments, an access credential may include payment account information or a token associated with the payment account information, a cryptogram, a digital certificate, etc. A "transaction code" may be an example of an access credential.

An "access device" can include a device that allows for communication with a remote computer. In some embodiments an access device and can include a device that enables a user to make a payment to a merchant in exchange for goods or services. An access device can include hardware, software, or a combination thereof. Examples of access devices include point-of-sale (POS) terminals, mobile phones, tablet computers, laptop or desktop computers, user device computers, user devices, etc.

An "application" may be computer code or other data stored on a computer readable medium (e.g., memory element or secure element) that may be executable by a processor to complete a task. Examples of an application include a registrar communication application, a token application, or an API services application. An application may include a mobile application. An application may be designed to proliferate and establish a trust and communication protocol between federated networks of computing devices. An application may enable a user to initiate a transaction with a resource provider or merchant and authorize the transaction.

A "user" may include an individual. In some embodiments, a user may be associated with one or more personal accounts, computing devices, and/or mobile devices. The user may also be referred to as a cardholder, account holder, or consumer in some embodiments.

A "resource provider" may be an entity that can provide a resource such as goods, services, information, and/or access. Examples of resource providers include merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments System) which processes authorization requests and a Base II system which performs clearing and settlement services. A payment processing network may be referred to as a processing network computer.

FIG. 1 depicts an example system architecture capable of implementing at least some embodiments of the current disclosure. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

FIG. 1 depicts an open trust network 100 that includes a trust management system 102 for establishing, maintaining, and proliferating the open trust network 100 for federated networks of computing devices and communicating with associated registrars. The trust management system 102 may include a processing network 104 and a corresponding processing network registrar 106. In embodiments, processing network 104 may include data processing subsystems, networks, and operations used to support and deliver authorization services, exception file services, and clearing and settlement services. For example, IoT devices in federated networks of computing devices may be utilized by a user to conduct a transaction (i.e., purchase an item) and the processing network 104 may process such transactions including authentication, verification, and clearing and settlement services. In some embodiments, the processing network registrar 106 may maintain a mapping of canonical addresses (i.e., transport IP addresses) for each registrar that corresponds to a member of the open trust network 100. In embodiments, the processing network registrar 106 may generate and/or provide one or more tokens to corresponding registrars of federated networks of computing devices for establishing a secure connection between said parties. In embodiments, the trust management system 102 and processing network 104 may utilize or be one link in a block chain voting structure that includes one or more processing network federated block chains 108. As described herein, the voting structure utilized by the trust management system 102 is compatible with voting systems used by other members of the open trust network 100 (such as a tree voting structure). In embodiments, the trust management system 102 may be in communication with one or more resource provider computers (not pictured) for processing transactions via IoT devices.

FIG. 1 also includes a plurality of IoT devices 110-120, each representing a different type of IoT device (e.g., a wearable device 116 vs. a smart refrigerator 112). Although a plurality of IoT devices are illustrated in FIG. 1, embodiments disclosed herein may include more or fewer IoT devices. Users may interact with the IoT devices 110-120 to browse, search, and purchase items or services, or interact with a plurality of software applications associated with or provided by the IoT device. FIG. 1 depicts a first federated network of computing devices 122 and a second federated network of computing devices 124 each including one or more IoT devices (110-114 and 116-120, respectively). The first federated network of computing devices 122 includes a corresponding first registrar 126 and the second federated network of computing devices 124 includes a corresponding second registrar 128. Communication between each member (102, 122, and 124) may be achieved via one or more communication networks 130 such as the Internet. In embodiments, the first registrar 126 and the second registrar 128 may be software, hardware, or any suitable combination of both for enabling a distributed management and proliferation of a communication and trust protocol in the open trust network 100.

In embodiments, each registrar 126 and 128 may generate and maintain a hierarchical addressing scheme that includes a canonical address for communicating between each federated network of computing devices 122 and 124. For example, the first registrar 126 may include a transport IP address that serves as the unique identifier for the first registrar 126 and can be invoked or queried by other registrars in the open trust network 100 to begin communication. The transport IP address may adhere to a canonical address format to enable efficient communication between members of the open trust network 100. In embodiments, the registrars 126 and 128 may generate, assign, and maintain one or more addresses for each of their respective IoT devices (110-114 and 116-120). In embodiments, each IoT device may be generated and assigned a local device ID, and each corresponding application or API service of the IoT device may include an application ID. The registrars may adhere to the canonical address format when generating and assigning addresses for ease of communication between devices. For example, a query from smart refrigerator 112 to wearable device 116 may adhere to a particular addressing format to allow location and proper processing by the associated registrars 126 and 128. Current systems lack the capability to allow IoT devices of different and/or same types to communicate across networks of computing devices let alone locate each other. The registrars 126 and 128 may generate the addresses by utilizing a hashing procedure on an already known address such as a current device identifier or media access control address. In some embodiments, addresses may be generated by encrypting known addresses using a private-public key pair that is provided by the trust management system 102 to each member of the open trust network 100.

In some embodiments, each registrar 126 and 128 may authenticate each IoT device belonging to an associated federated network of computing devices (122 and 124). An authentication procedure may also take place when a new device is added to each federated network. The authentication process may include a registrar obtaining a device identifier and application and/or API services identifier for each device, communicating with the trust management system 102 and providing a generated token to verify authentication to the newly registered/added device. In some embodiments, each registrar may have one or more policies for verifying trust between devices within a federated network of computing devices. For example, one policy could indicate that a user verification or confirmation must be performed before a device can be added to the federated network and trusted (i.e., provided a token). Upon authenticating a device or adding a new device, the registrar (126 and 128) may generate new addresses according to the hierarchical addressing scheme and update a mapping of addresses for the corresponding devices of an associated federated network of computing devices (122 and 124). User verification or confirmation can include providing authentication information such as an answer to a challenge question, a password, a personal identification number (PIN), or a biometric sample.

In embodiments, a first IoT device from one federated network of computing devices (122) may attempt to communicate with another IoT device from another federated network of computing devices (124). For example, the smart refrigerator 112 may attempt to communicate with the wearable device 116 via communication networks 130. To begin establishing a secure connection and locating the wearable device 116, the associated registrars may communicate. First registrar 126 may communicate with second registrar 128 on behalf of smart refrigerator 112 in some embodiments. In still other embodiments, the IoT devices (112 and 116) may attempt to communicate directly. In embodiments, the second registrar 128 may determine that first registrar 126 (and associated IoT devices) is trusted by communicating with the trust management system 102. In some embodiments, the trust management system 102 may determine whether the first federated network of computing devices 122 is a member of the open trust network 100. In still other embodiments, the second registrar 128 may begin a voting procedure within its own federated network 124 to determine whether to trust the first federated network 122. As described herein, the second federated network 124 can utilize any suitable voting structure (i.e., block-chain, tree, or hybrid) to vote whether to trust the first federated network of computing devices 122.

In some embodiments, trust between federated networks of computing devices is determined based on a vote from each member of the open trust network 100. For example, trust management system 102, second federated network of computing device 124 and other members (i.e., other federated network of computing devices) may each utilize their own internal voting structures and cast a vote on whether to trust a members communication or allow a new member. Each member of the open trust network 100 may be assigned a weight for their given vote which may affect the outcome of whatever decision is being voted on. In embodiments, the first registrar 126 may locate the second registrar 128 by verifying the existence of the location address for the second registrar 128 in its own storage and/or memory. In other embodiments, the first registrar 126 may be periodically updated with the location information for newly added members by the trust management system 102 or may query the trust management system 102 for location information. The trust management system 102 may establish and maintain one or more policies and thresholds for determining a vote required to trust a federated network of computing devices or to add a new member to the open trust network 100. Newly added member information and their location information (transport IP) may be periodically provided to the distributed registrars of the open trust network 100 by the trust management system 102.

Upon locating and establishing trust with the second registrar 128, the second registrar 128 may request a token from the wearable device 116. The token may contain information for properly communicating with the wearable device 116 according to the canonical addressing format described herein. In some embodiments, the token may contain other information such as requested information from an application, API calls, or API service requests from applications and APIs associated with wearable device 116. For example, after a secure connection has been established between IoT devices of different federated networks, one device may provide information regarding an application (such as transaction information or information provided by a user interacting with a particular application) utilizing a token. In some embodiments, the second registrar 128 may generate and provide the token with the requested or appropriate information to the first registrar 126. Thereafter, the first registrar 126 may provide the token to the smart refrigerator 112. With the proper addressing information obtained by the smart refrigerator 112, a secure connection may be established between the smart refrigerator 112 and the wearable device 116 utilizing the token. In some embodiments, the processing network registrar 106 and/or the trust management system may provide the token from the second registrar 128 to the first registrar 126 and establish the secure connection between the smart refrigerator 112 and wearable device 116 utilizing the token.

Embodiments of the present disclosure include technical advantages for communicating between previously untrusted and/or undetected IoT devices that belong to different federated networks of computing devices. For example, the registrars can serve as intermediaries that establish trust and obtain location information to allow communications to be securely establish. Prior to the present disclosure, IoT devices lacked the capability to communicate to other IoT devices of a different type let alone IoT devices that operate in other federated networks. Further, by utilizing the registrar a layer of privacy and protection is provided as the IoT devices can communicate utilizing the hierarchical addressing scheme maintained by the registrar (device ID and application ID) that obfuscate the true device ID and application information. As such, any fraudster that obtains the device ID and application ID of the hierarchical addressing scheme would be unable to perform any operations with the said device until it was a trusted member and could not directly address the IoT device as the actual addressing information is obscured from other entities including IoT devices within their own network.

In some embodiments, the communication request between IoT devices of different federated networks of computing devices may be initiated by a transaction utilizing one of the devices. In such use cases, the token may contain information such as account information, credit card numbers, bank account numbers, digital wallet references, other suitable information such as personal authentication information, a shipping address, and contact information. Information about one or more computer devices (device information) or a user may be obtained by the associated registrar during an enrollment or verification process as described above. Other information such as device identifiers, network identifiers, and global positioning satellite information may be obtained during such a procedure. In some embodiments, tokens generated and requested during communication requests may be further encrypted utilizing any suitable encryption method to ensure privacy of information between federated networks of computing devices. For example, a token may be encrypted using a public-private key pair that is maintained by a registrar computer system and a processing network registrar computer system.

In some embodiments, the trust management system 102 may maintain one or more thresholds for different types of transactions (such as a particular threshold for transactions involving currency and a different threshold for transactions involving access to data). The trust management system may utilize the different thresholds in transaction use cases to verify or a transaction between IoT devices. For example, a first transaction that involves a monetary transfer between a banking entity and an online merchant may dictate that the banking entity and two other banking entities have signed a token before communication can be established between IoT devices. In another example, a transaction that involves granting access to a shared resource, such as a wireless network, may only require that the token be signed by a trusted member of the open trust network before communication is established between IoT devices and access is granted to the wireless network.

In embodiments where a payment transaction is occurring, the trust management system 102 may communicate with a resource provider computer and/or an issuer computer. The resource provider computer or the trust management system 102 may then generate an authorization request message which may request authorization for the desired transaction. The authorization request message may be received an issuer computer in communication with the trust management system 102. Either may determine that a user has an appropriate amount of funds to complete the transaction that involves a monetary amount. In embodiments, the trust management system 102 or an issuer computer in communication with the trust management system 102 may generate and provide an authorization response message to the resource provider computer.

The trust management system 102 and processing network registrar 106 may include a processor, memory, input/output devices, and a computer readable medium coupled to the processor. The computer readable medium may comprise code, executable by the processor for performing the functionality described herein. In some embodiments, the trust management system 102 and processing network registrar 106 may include applications (e.g., computer programs) stored in the memory and configured to retrieve, present, and send data across a communications network (e.g., the Internet).

The first registrar 126 and second registrar 128 may be comprised of various modules that may be embodied by computer code, residing on computer readable media. The first registrar 126 and second registrar 128 may include a processor and a computer readable medium coupled to the processor, the computer readable medium comprising code, executable by the processor for performing the functionality described herein.

The IoT devices 110-120 may each include a processor and a computer readable medium coupled to the processor, the computer readable medium comprising code, executable by the processor. In some embodiments, the IoT devices 110-120 may be coupled to a database and may include any hardware, software, other logic, or combination of the preceding for servicing user interactions including communication and transaction requests to one or more other IoT devices.

Messages between the computers, networks, and devices may be transmitted using secure communications protocols such as, but not limited to, File Transfer Protocol (FTP); HyperText Transfer Protocol (HTTP); Secure Hypertext Transfer Protocol (HTTPS); Secure Socket Layer (SSL); ISO (e.g., ISO 8583) and/or the like.

In embodiments, an application of automobile 118 of the second federated network 124 may attempt to communicate with the smart refrigerator 112 of the first federated network 122. In embodiments, the second registrar 128 may query the processing network registrar 106 for the addressing information for the first registrar 126. In various embodiments, the trust management system 102 may maintain addressing information for each member (i.e., federated network of computer resources) in the open trust network 100. Further, the trust management system 102 and processing network registrar 106 may proliferate polices that establish a minimum level of signatures or votes required before trust can be established between two members. To return to the example, the first registrar 126 may identify that the communication request from the second registrar 128 has never been established (e.g., a communication from a previously unknown entity within the open trust network 100).

In embodiments, a policy may be selected based on whether the communicating entity has previously been encountered or is a new contact. To illustrate, the first registrar 126 may apply a policy that requires that the EID associated with the automobile 118 application be signed or voted on by three other members (not pictured) in the open trust network 100 before trust can be established. As described herein, the EID may be associated with or include information that can be utilized by the first registrar 126 to determine who has signed the EID and what their relative weight is with respect to their provided signature or vote. Assuming that the automobile 118 application's EID or credential includes the appropriate amount and weight of signatures, the first registrar 126 may provide a confirmation prompt or query to a user of the smart refrigerator 112 to verify the communication request from the automobile 118 application. Further, the second registrar 128 may provide a similar query to a user of the automobile 118 application inquiring that someone has provided their associated EID to establish communication with another IoT device (i.e., smart refrigerator 112). Upon receiving confirmation, the first registrar 126 may update its contact records, and request and/or generate a token that includes the appropriate signaling information to enable communication between the automobile 118 application and the smart refrigerator 112. In various embodiments, token generation, verification of signatures via public keys, and provision information may be performed by the first registrar 126, second registrar 128, and/or the processing network registrar 106.

Figure 2:
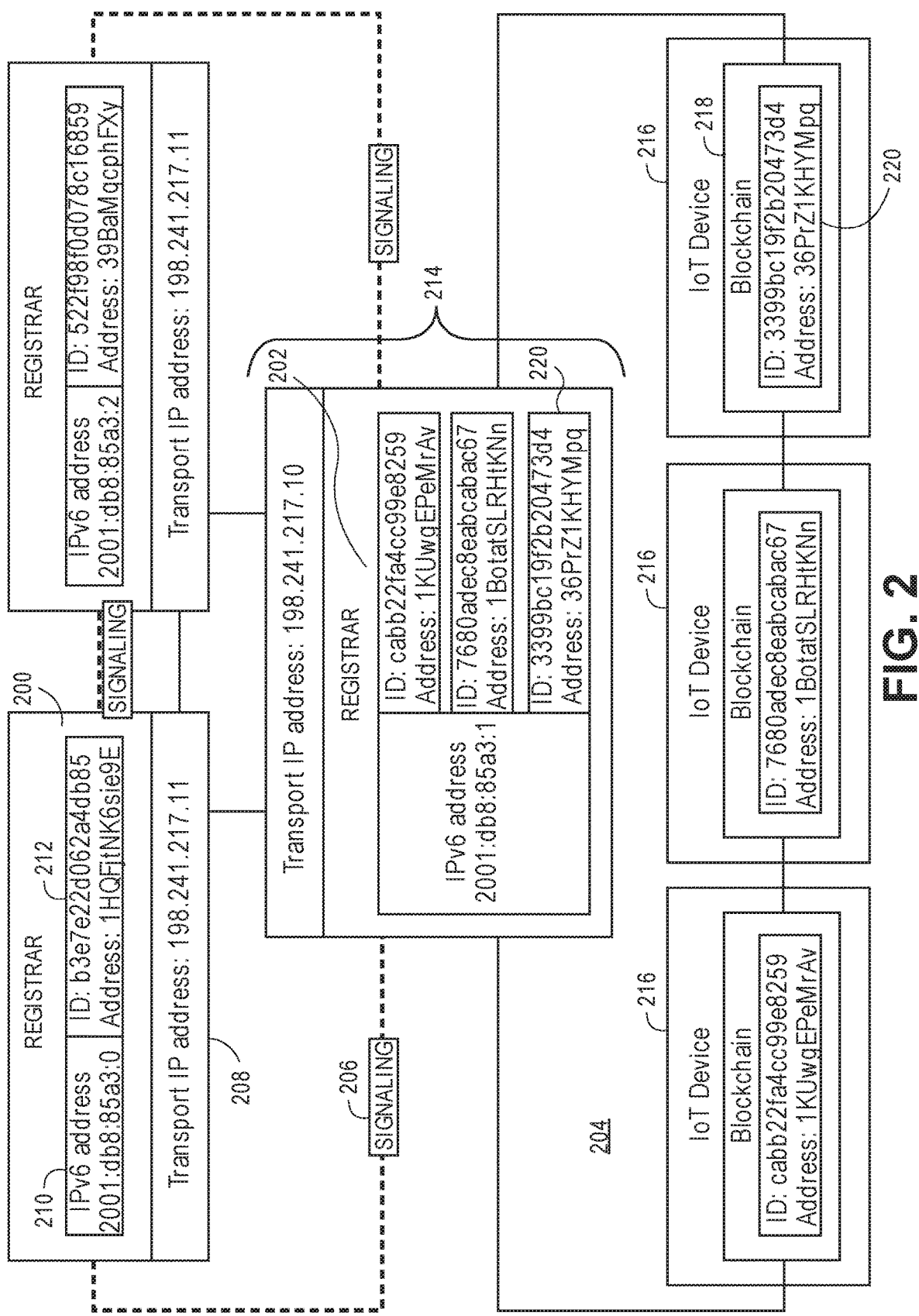
FIG. 2 depicts a block diagram of a hierarchical addressing scheme to enable signaling between registrars.

FIG. 2 depicts a block diagram of a hierarchical addressing scheme to enable signaling between registrars. FIG. 2 includes several registrars 200, 202, that are associated with respective IoT devices that make up a federated network of computing devices, such as federated network 204. The dashed lines in FIG. 2 represent the signaling pathways 206 and/or communication lines between registrars in an open trust network that enable secure connections between IoT devices belonging to different as of yet untrusted federated networks of computing devices. The registrar 200 includes a transport IP address 208, an IPV6 address 210, and an ID and local address 212 that represents a hierarchical address scheme that follows the canonical address format. In embodiments, the transport IP address can be utilized to communicate between registrars 200 and 202. In some embodiments, the IPV6 address represents a federated network address 210 that represents the federated network of computing devices. In embodiments, the transport IP address and/or the IPV6 address may be utilized to locate and communicate a registrar in the open trust network. It should be noted that although the addresses depicted in FIG. 2 include IPV6 addresses, IPV4 addresses and any other suitable internet protocol address may be utilized in generating addresses for the registrars, devices, applications, and related API services.

As described herein, the registrar 200 may maintain a mapping of local device identifiers and addresses 212. In embodiments, the registrar 200 may generate and assigned local device identifiers and addresses 212 to protect security and adhere to the canonical address format. In other embodiments, the federated network address 210 may serve as the locator address and all subsequent requests for a device of an associated federated network of computing devices may query the federated network address 210. For example, a request could be processed by registrar 200 from another registrar 202, by receiving and interpreting a request for an associated IoT device by processing the request to the IPV6 address 210. In some embodiments, the request, transaction request, or communication may be parsed, such decrypting a received token, to establish communication between two IoT devices belonging to different federated networks of computing devices. In embodiments, the local identifier and address 212 may be provided, via the registrar 212, to registrar 202 so that a direct secure connection can be established. In other embodiments, the generated local identifier and address 212 may be provided and mapped be provided to maintain privacy and security of IoT devices by the registrar. Thus, incoming requests to a said address and identifier may be mapped to an actual local ID and address by the registrar 200 to locate an appropriate IoT device and/or application.

FIG. 2 includes registrar 202 which includes a hierarchical addressing scheme 214 that represents multiple IoT devices 216 that correspond to a federated network of computing devices 204. As depicted in FIG. 2, the IoT devices 216 utilize a block chain voting structure 218 to make decisions, such as trusting requests from other IoT devices. As noted herein, each federated network of computing devices in the open trust network may utilize their own voting structure without affecting the voting structure of another federated network of computing devices. As illustrated in FIG. 2, the registrar 202 maintains a mapping of a device identifier and address 220. As IoT devices 216 are added or removed from federated network 204, the mapping of registrar 202 may be updated to add more addresses or remove addresses. In embodiments, the hierarchical addressing scheme 214 may represent an organized path from a top node address (transport IP, IPV6 address) to lower address nodes (device ID, application ID, etc.). The use of the hierarchy address scheme 214 may prevent overflow and reuse of addresses that need to serve as unique addresses for location purposes. As members join or are added to the open network the scalable nature of the hierarchical addressing scheme can prevent memory over usage and confusion between locating a particular entity. As described herein, the registrars 200 and 202 may generate and assign the device identifiers and application addresses 212, 220 utilizing a hashing procedure or an encryption procedure that utilizes a public-private key pair provided by the trust management system.

Figure 3:
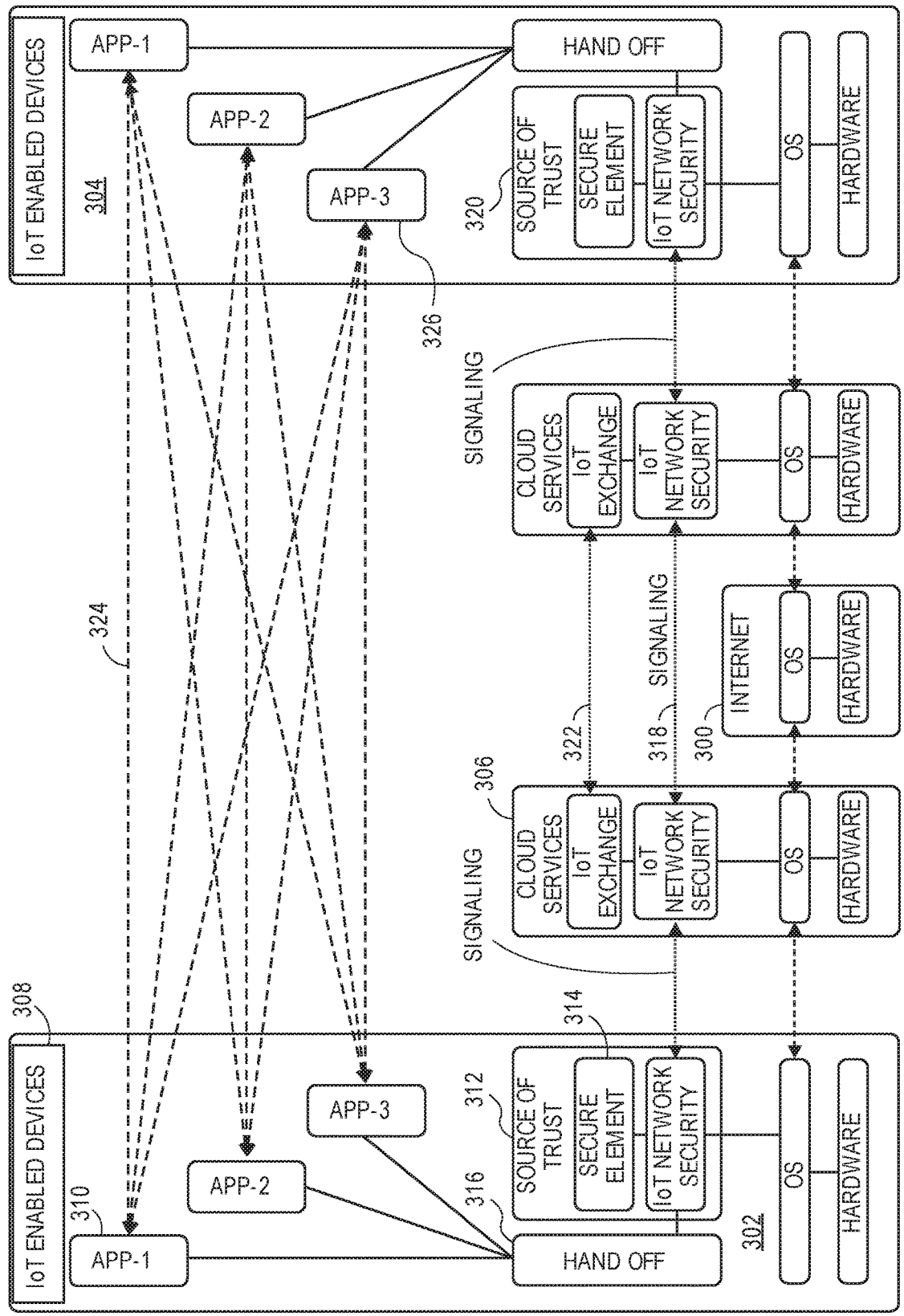
FIG. 3 depicts a block diagram of a system and signaling flow according to embodiments of the current disclosure.

FIG. 3 depicts a block diagram of a system and signaling flow according to embodiments of the current disclosure. FIG. 3 includes an architecture for implementing an open trust network as described herein. The architecture includes a communication network 300 such as the internet which may be provided by an internet provider that utilizes an operating system and corresponding hardware to implement the communication network 300. Each federated network of computing devices 302 and 304 may be implemented or associated with cloud services 306 that include an IoT exchange and IoT network security for enabling security and communication between IoT devices within a federated network. The cloud services 306 may include virtual instances, software, and hardware, to implement the details depicted in FIG. 3 such as an operating system and corresponding hardware (processors, software modules, memory, and computer storage). A federated network of computing devices, such as 302, may include several components including one or more IoT enabled devices 308, one or more applications 310, a source of trust 312 with a corresponding secure element 314 and a handoff mechanism 316. In embodiments, the source of trust 312 may be utilized to authenticate IoT enabled devices 308 within the federated network 302 and to vote to trust other federated networks of computing devices (304). For example, the source of trust 312 may implement a block-chain voting structure for the IoT enabled devices 308 to enable a vote to determine whether to trust or verify a communication request from federated network 304. In some embodiments, the source of trust 312 may include a secure element 314 for generating and maintaining one or more tokens for verification within its own federated network (302) and for providing tokens containing location information to other federated networks (304). In embodiments, the source of trust 312 and secure element 314 may represent a registrar such as registrar 126 (FIG. 1). In embodiments, the secure element 314 and source of trust 312 may maintain one or more policies for determining voting structures, verifying communications, generating addresses, and tokens. The handoff mechanism 316 may be configured to process communication requests from trusted members in the open trust network. For example, a transformation procedure may need to occur when a communication request is processed as a public (trusted) facing address may not correspond to an actual device identifier or application identifier as described herein. The handoff mechanism 316 may perform the transformation and process the request to the appropriate IoT enabled device 308 and/or application 310. Such procedures may also be performed by the registrars described herein. In some embodiments, the IoT enabled devices 308 may be configured to run or be associated with one or more software applications or API services 310.

FIG. 3 also includes signaling 318 that occurs between sources of trust 312 and 320 upon the federated networks 302 and 304 establishing trust as described herein. In the architecture depicted in FIG. 3, the cloud services 306 implementing or associated with federated network 302 may perform an IoT exchange 322 between federated networks 302 and 304 once trust has been established. In embodiments, the IoT exchange 322 may include sharing device identifiers and application addresses to update respective mapping and information for each cloud service 306. In some embodiments, the IoT exchange 322 merely shares the information required for communication between the IoT devices establishing a connection as to ensure security and privacy of other associated IoT devices 308 of a federated network 302. In embodiments, once trust has been established between the federated networks of computing devices 302 and 304, signaling 324 may occur between applications 310 and 326 and IoT devices associated with each federated network 302 and 304. As described herein, a token may be generated and provided by source of trust 320 to source of trust 312 for use in establishing a secure connection between applications 310 and 326 of federated networks 302 and 304 respectively. Thus, IoT devices residing in different federated networks of computing devices are enabled to locate and communicate with each other despite the IoT devices being of a different type or the applications lacking support to communicate with other applications. The canonical address format proliferated in the open trust network establishes a protocol for communicating between applications 310 and 326 and thus the signaling 324 can occur to conduct transactions for items, services, or access to data or a secure area.

Figure 4:
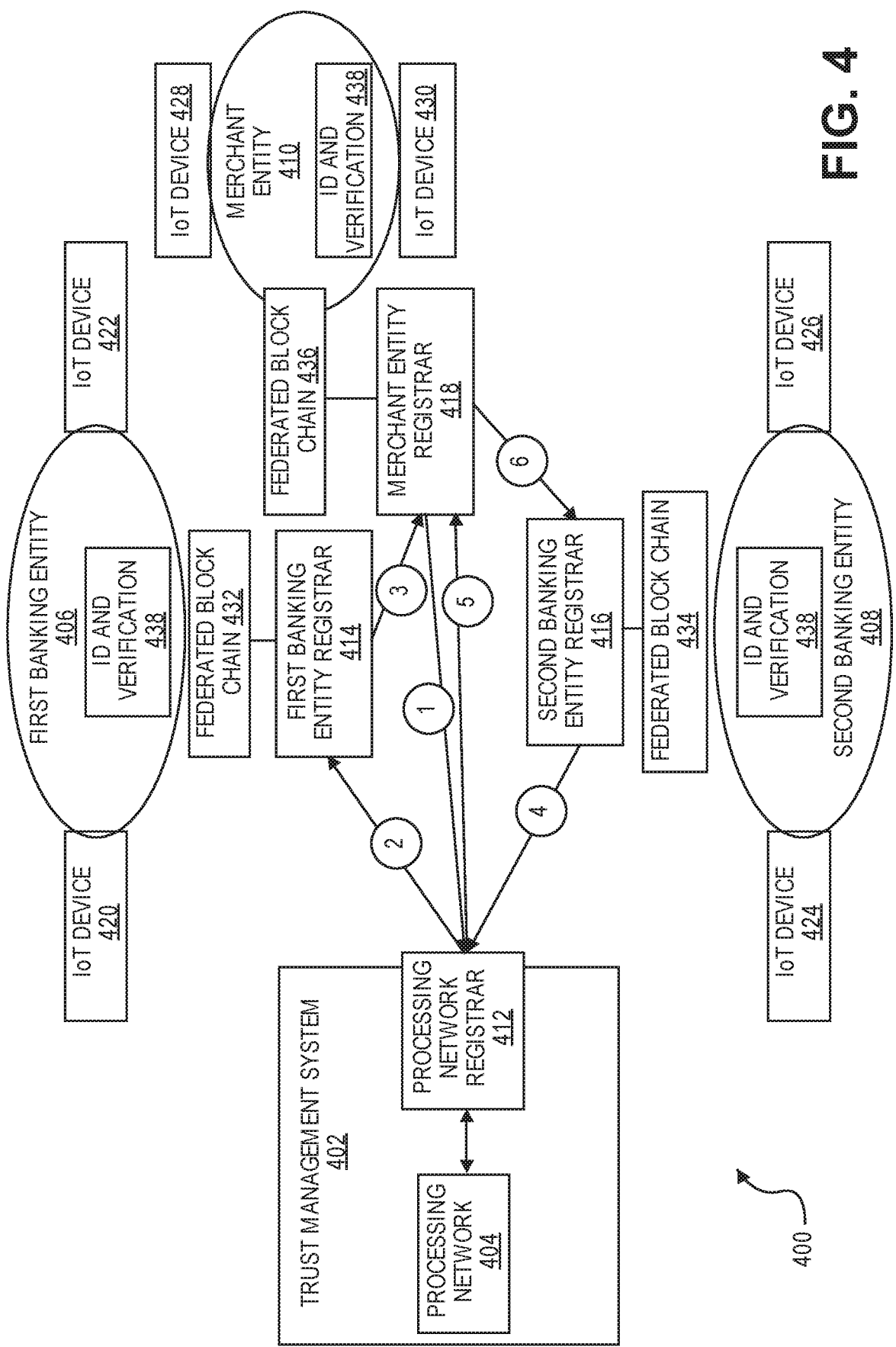
FIG. 4 depicts an example system architecture capable of implementing at least some embodiments of the current disclosure.

FIG. 4 depicts an example system architecture capable of implementing at least some embodiments of the current disclosure. The architecture 400 includes a trust management system 402. In embodiments, the trust management system 402 may be associated with a processing network 404 that may include a payment processing network. The trust management system 402 may interact and communicate with other members of an open trust network (first banking entity 406, second banking entity 408, and merchant entity 410) via the processing network registrar 412. In embodiments, each member (406, 408, and 410) may implement a corresponding registrar 414, 416, and 418. As depicted in FIG. 4, each member may include several components that are part of a federated block chain. For example, first banking entity 406 may include one or more IoT devices 420 and 422, second banking entity 408 may include IoT devices 424 and 426, and third banking entity 410 may include IoT devices 428 and 430 as part of federated block chains 432, 434, and 436 respectively.

In some embodiments, each member (406, 408, and 410) may be configured to perform identification and verification 438 for entities seeking to access shared resources, conduct transactions, or become a known entity within a particular federated network of computing devices. Each registrar (412, 414, 416, and 418) may maintain information that identifies location information, using a canonical addressing scheme, for other members of an open trust network, biometric templates used in an authentication process, a hierarchical addressing scheme and corresponding addresses for communicating within each federated block chain, a private and public key used to sign tokens, and one or more tokens maintained on IoT devices or other computer devices that are part of the federated network of computing devices and have authenticated themselves. FIG. 4 depicts several steps which may represent various use cases for authenticating an entity conducting a transaction within architecture 400. For example, step 1 includes an entity that has previously authenticated with first banking entity 406, desiring to conduct a transaction within the merchant entity 410. For example, the entity may desire to lease access to IoT device 430 or an application configured to run on IoT device 428. In response to the entity initiating the transaction, the merchant entity registrar 418 may identify that the entity is unknown within federated block chain 436 and request or query the trust management system 402, via processing network registrar 412, to verify the entity.

At step 2, the trust management system 402 and processing network registrar 412 may identify the appropriate member (first banking entity 406). In embodiments, the processing network registrar 412 may maintain and update a mapping of entities, members that have verified (signed) for the entities, and location information (canonical addresses) for communicating with the members. In embodiments, the identification and verification of the transaction started at step 1 will be transmitted to the first banking entity registrar 414 at Step 2. In various embodiments, the authentication request provided at Step 1 may include a token provided by a computing device of the entity conducting the transaction within federated block chain 436. The first banking entity 406 and first banking entity registrar 414 may be configured to analyze the token and biometric information associated with the token to verify the entity and the corresponding user device.

For example, the first banking entity registrar 414 may identify its own signature provided to the token and match the biometric information to a biometric template that was previously provided, perhaps in an initial authentication or initiation step. If the appropriate signature is not provided (i.e., the first banking entity registrar 414 is unable to detect its signature with the provided token, or the biometric information does not match the biometric template for the user), then the first banking entity registrar 414 may decline or deny the authentication request from the merchant entity registrar 418. Otherwise, the first banking entity registrar 414 may provide a confirmation of the authentication to the merchant entity registrar 418. In some embodiments, upon receiving approval, the merchant entity registrar 418 may update its mapping, sign the token, and provide the entity and associated computing device with access to other devices (428, 430) or approve a transaction. In various embodiments, the processing network 404 may perform clearance and settlement for the transaction conducted within the federated block chain 436. In some embodiments, the merchant entity registrar 418 may sync with the processing network registrar 412 to update mapping of entities, tokens, etc.

To illustrate another example of the embodiments described herein, a user with a corresponding user device may desire to conduct a transaction with the second banking entity 408. In response to the second banking entity registrar 416 determining that the user and the user device are unknown entities, the second banking entity registrar 416 may communicate and/or query the processing network registrar 412 at step 4 about the entity. As described in the steps above, the trust management system 402 and processing network registrar 412 may defer or redirect the verification and identification of the user and user device to another entity, in this case to the merchant entity registrar 418 at step 5. In the illustrated example, the user may have previously interacted and authenticated with merchant entity 410 and merchant entity registrar 418. An indication of the previous authentication may be maintained by the processing network registrar 412 upon a sync operation performed between the processing network registrar 412 and merchant entity registrar 418. The sync operations between registrars of members of the open trust network may be performed periodically or dynamically upon completion of every transaction. At Step 6, the merchant entity registrar 418 may provide a decline or approval of the authentication and verification of the user and user device attempting to conduct a transaction with the second banking entity 408. As described herein, the merchant entity registrar 418 may analyze the token, apply policies, determine signatures, and match the biometric information provided with the token during the authentication request to a biometric template to verify or deny the authentication request for the transaction. In various embodiments, the processing network 404 may perform clearance and settlement for the transaction conducted within the federated block chain 434. In some embodiments, the second banking entity registrar 416 may sync with the processing network registrar 412 to update mapping of entities, tokens, etc.

Figure 5:
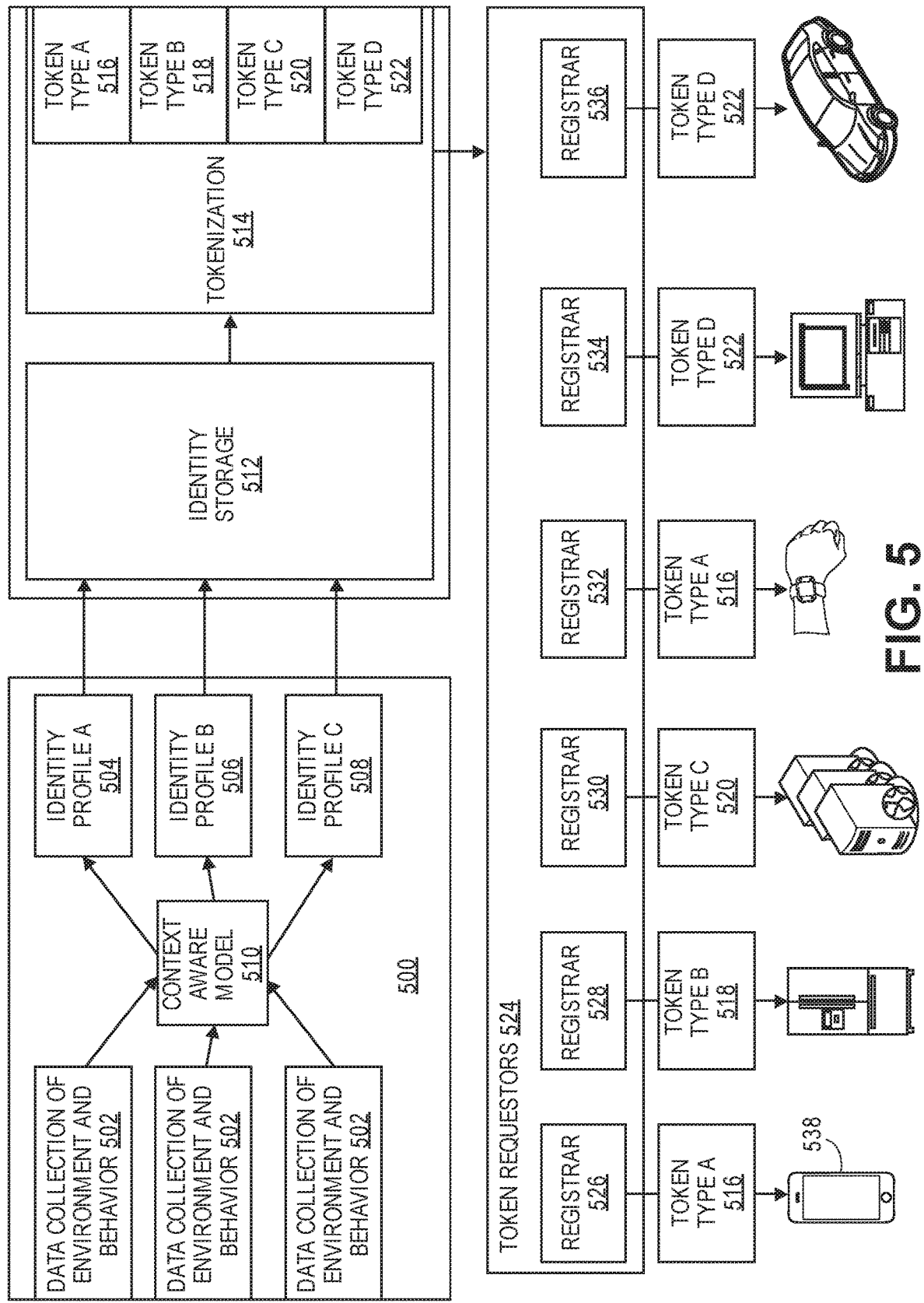
FIG. 5 depicts a block diagram of a system and signaling flow according to embodiments of the current disclosure.

FIG. 5 depicts a block diagram of a system and signaling flow according to embodiments of the current disclosure. FIG. 5 depicts an entity 500 that may perform various data collection of environment and behavior 502 for a user conducting transactions within an associated federated network of computing devices or another federated network of computing devices that is in communication with entity 500. In embodiments, entity 500 may represent a banking entity, a merchant entity, or a trust management entity. In various embodiments, the entity 500 may utilize the collected environment data and behavior data 502 to generate one or more identity profiles 504, 506, and 508 using a context aware model 510. In embodiments, the context aware model 510 may be a machine learning algorithm that utilizes the collected data of environment and behavior 502 to generate one or more models for identifying identity profile A 504, identity profile B 506, and identity profile C 508. In some embodiments, each identity profile 504, 506, and 508 may identify a different digital representation of the user conducting the transactions. For example, identity profile A 504 may indicate behaviors of a user within a certain location (i.e., spending habits and purchase locations within a shopping mall), whereas identity profile B 506, may indicate behaviors of the user within another location or federated network of computing devices (i.e., spending habits and favorite web pages to visit while online shopping).

FIG. 5 illustrates the entity storing the identity profiles 504, 506, and 508 within an identity storage 512. The identity storage 512 may tokenize 514 each identity profile into a plurality of token types 516-522 in embodiments. An associated registrar computer system may implement the data collection of environment and behavior data 502, the context aware model 510, generation of identity profiles 504-508, and tokenization 514. Each token type may represent an appropriate token for a given context or token requestor when conducting a transaction within an open trust network as described herein. For example, FIG. 5 illustrates token requestors 524 that represent various entities and contexts requesting tokens from entity 500. Each token requestor 524 may have a corresponding registrar 526-536. In embodiments, a token requestor, such as registrar 526 acting on behalf of a mobile phone 538, may be provided token type A 516 in response to the request based on the context of the transaction being conducted with mobile phone 538. For example, token type A 516 may represent an identity profile A 504 that is associated with transactions that are conducted with a mobile phone. As such, token type A 516 is provided to mobile phone 538 to conduct a transaction involving entity 500 and a registrar corresponding to mobile phone 538 (or mobile phone 538 directly). For example, a user could be requesting access to a digital wallet of mobile phone 538 to conduct a transaction such as a transfer of funds. In some embodiments, the requesting registrar may identify a particular token type based on the associated transaction. In various embodiments, the entity 500 may select and provide an appropriate token type utilizing behavior and environment data provided from the requesting entity to select the appropriate token type.

Figure 6:
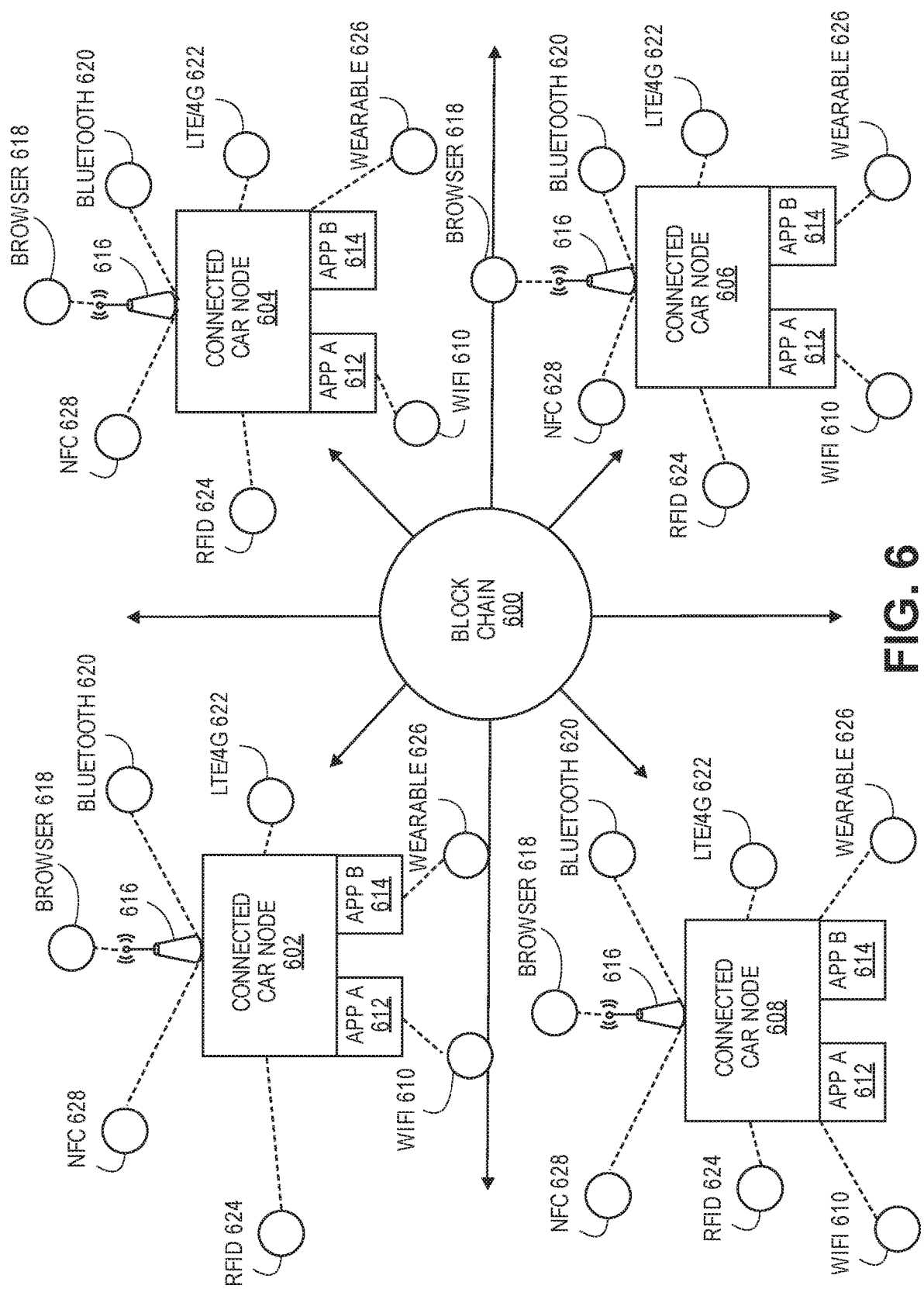
FIG. 6 depicts an exemplary federated block chain that includes one or more nodes according to embodiments of the current disclosure.

FIG. 6 depicts an exemplary federated block chain that includes one or more nodes according to embodiments of the current disclosure. FIG. 6 illustrates block chain 600 that may be configured to conduct or implement transactions for a shared resource. For example, block chain 600 may be associated with one or more nodes 602-608 that each represent a shared resource hub or terminal or represent a shared resource themselves. For example, the connected home node 604 may include a WiFi network 610 that may be for rent or grant access for a certain monetary amount to a user device that communicates and verifies according to processes described herein. In some embodiments, each node may have one or more associated applications 612, 614, for conducting transactions or interacting with other IoT devices of another federated network of computing devices. Access to the nodes on block chain 600 may be conducted via a corresponding registrar computer system (not pictured).

In some examples, each node 602-608 may have an associated communication port 616 available for intra network communication within a federated block chain of computing devices. The communication port 616 may utilize any suitable network technology such as wireless networks, landlines, Bluetooth, or near field communications (NFC). As illustrated in FIG. 6, each node 602-608 may have one or more other shared resources 618-628 or communication accessibilities for other shared resources that are hosted by each node 602-608 (not pictured). For example, user devices that may be utilized to conduct transactions may initiate a transaction by communicating with a node via radio frequency identification (RFID 624) to gain access, rent, lease, or purchase a shared resource hosted by connected office node 606. In embodiments, a registrar associated with block chain 600 may conduct the authentication process for granting access to a shared resource within the block chain 600 such as by communicating with a trust management system or another member of the open trust network to verify a requesting entity and device.

Figure 7:
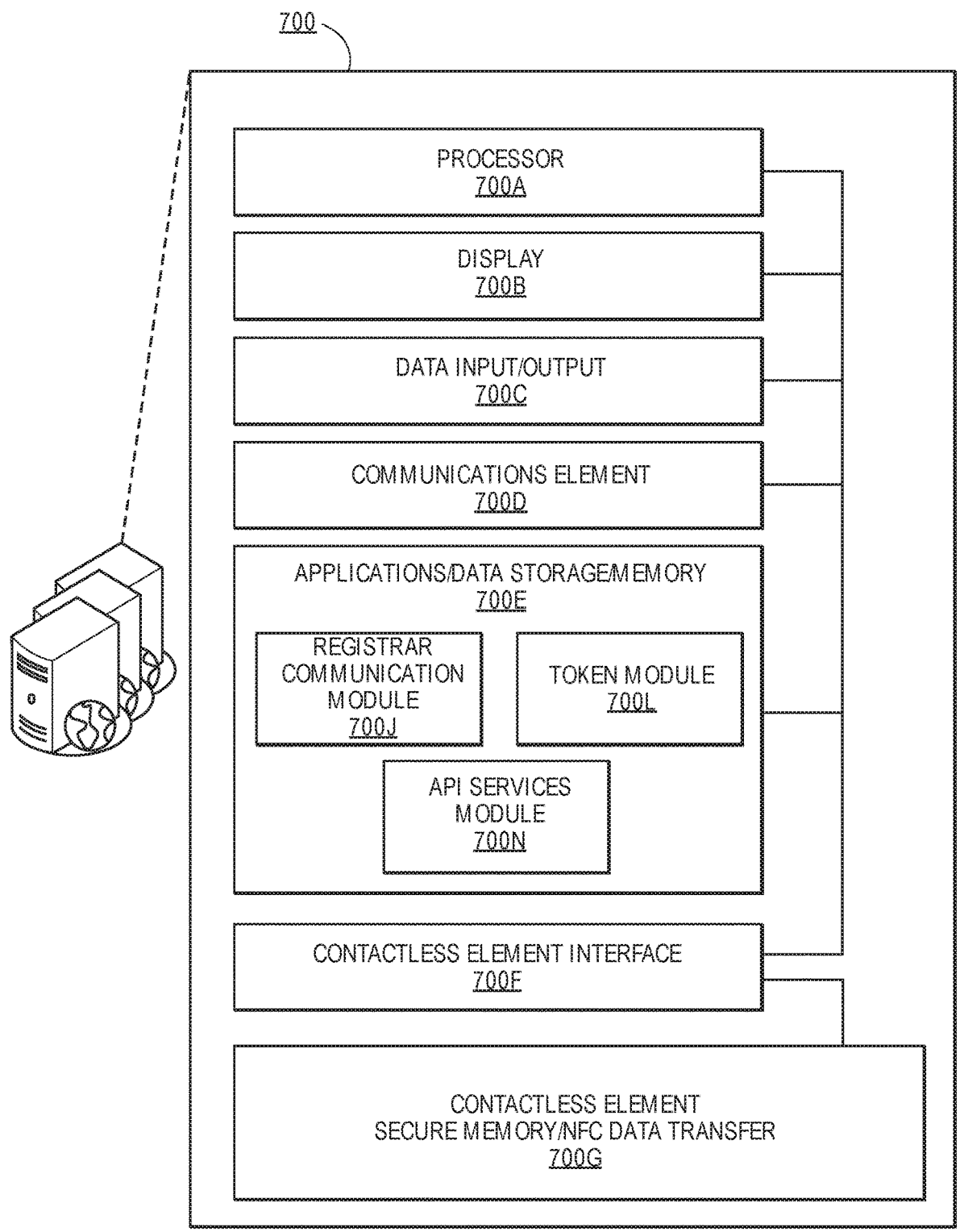
FIG. 7 depicts an exemplary registrar according to embodiments of the current disclosure.

An example of a registrar or registrar computer system implementing features described herein, according to some embodiments of the invention, is shown in FIG. 7. Registrar 700 may include circuitry that is used to enable certain device functions, such as processing trust requests, communication requests, generating and maintaining address information for IoT devices and associated applications, and generating and providing tokens with location information and/or for authentication purposes as described herein. The functional elements responsible for enabling those functions may include a processor 700A that can execute instructions that implement the functions and operations of the device. Processor 700A may access memory 700E (or another suitable data storage region or element) to retrieve instructions or data used in executing the instructions, such as provisioning scripts and applications. Data input/output elements 700C, such as a hand held device, joystick, haptic sensors, motion sensors, a keyboard, a mouse, or other haptic input devices, may be used to enable a user to operate an IoT device in communication with registrar 700 (e.g., confirmation of purchase, initiate a transaction, or provide personal authentication information).

Data input/output elements 700C may also be configured to output data via an associated IoT device. Display 700B may also be used to output data to a user. Communications element 700D may be used to enable data transfer between registrars, IoT devices, applications and/or API services of devices that are located in different federated networks of computing devices, and other entities associated with transactions such as a processing network, resource provider computers, or an issuer computer. Registrar 700 may also include contactless element interface 700F to enable data transfer between contactless element 700G and other elements of the registrar 400, where contactless element 700G may include a secure memory and a near field communications data transfer element (or another form of short range communications technology). In embodiments, a registrar 700 may be implemented in a mobile device and maintain the distributed relationship in the open trust network.

The memory 700E may comprise a registrar communication module 700J, a token module 700L, API services module 700N, and any other suitable module or data. The registrar 700 may have any number of applications or modules installed or stored on the memory 700E and is not limited to that shown in FIG. 7. The memory 700E may also comprise code, executable by the processor 700A for implementing methods described herein. As used herein, a "module" may include a software module, a hardware module, or any suitable combination of software and hardware to implement the techniques described herein.

The registrar communication module 700J may, in conjunction with the processor 700A, may enable establishing trust between registrars in an open trust network, and generate and maintain one or more addresses for locating an associated IoT devices or an associated application/API. The registrar communication module 700J and API services module 700N, and the processor 700A, may be configured to communicate with one or more outside services or entities including resource provider computers, a processing network, or other suitable entity for authenticating the transaction as described herein. In some embodiments, the registrar communication module 700J and API services module 700N, in conjunction with the processor 700A, may be configured to communicate with a trust management system to update the registrar 700 addresses, member information, maintained tokens, or other suitable information as described herein.

In some embodiments, the token module 700L may, in conjunction with the processor 700A, be configured to maintain and generate one or more tokens for authenticating a device within an associated federated network of computing devices or for establishing trust and communication with other federated networks, IoT devices, and or applications. In embodiments, an entity may be considered to be untrusted when an associated token, credential, or EID is modified, compromised, or lacks the required signatures and/or votes from other participating entities. In embodiments, the token module 700L and API services module 700N may, in conjunction with the processor 700A, be configured to communicate with the another registrar, another IoT devices, and/or an application or API service to establish a secure connection to conduct communication or a transaction. In some embodiments, in order to increase security, tokens may not be stored at the registrar 700. Instead, the tokens can be temporarily retrieved from a remote server or cloud server when a communication and/or transaction request is being performed. In embodiments, the tokens may be generated and provided by the trust management system. In some embodiments, the token module 700L may store and utilize one or more private-public key pairs to sign and or encrypt the generated and provided tokens. In some embodiments, the API services module 700N and processor 700A may be enabled to process communication requests between applications of different federated networks by performing a mapping lookup of addresses and identifiers maintained by the registrar communication module 700J and registrar 700.

Figure 8:
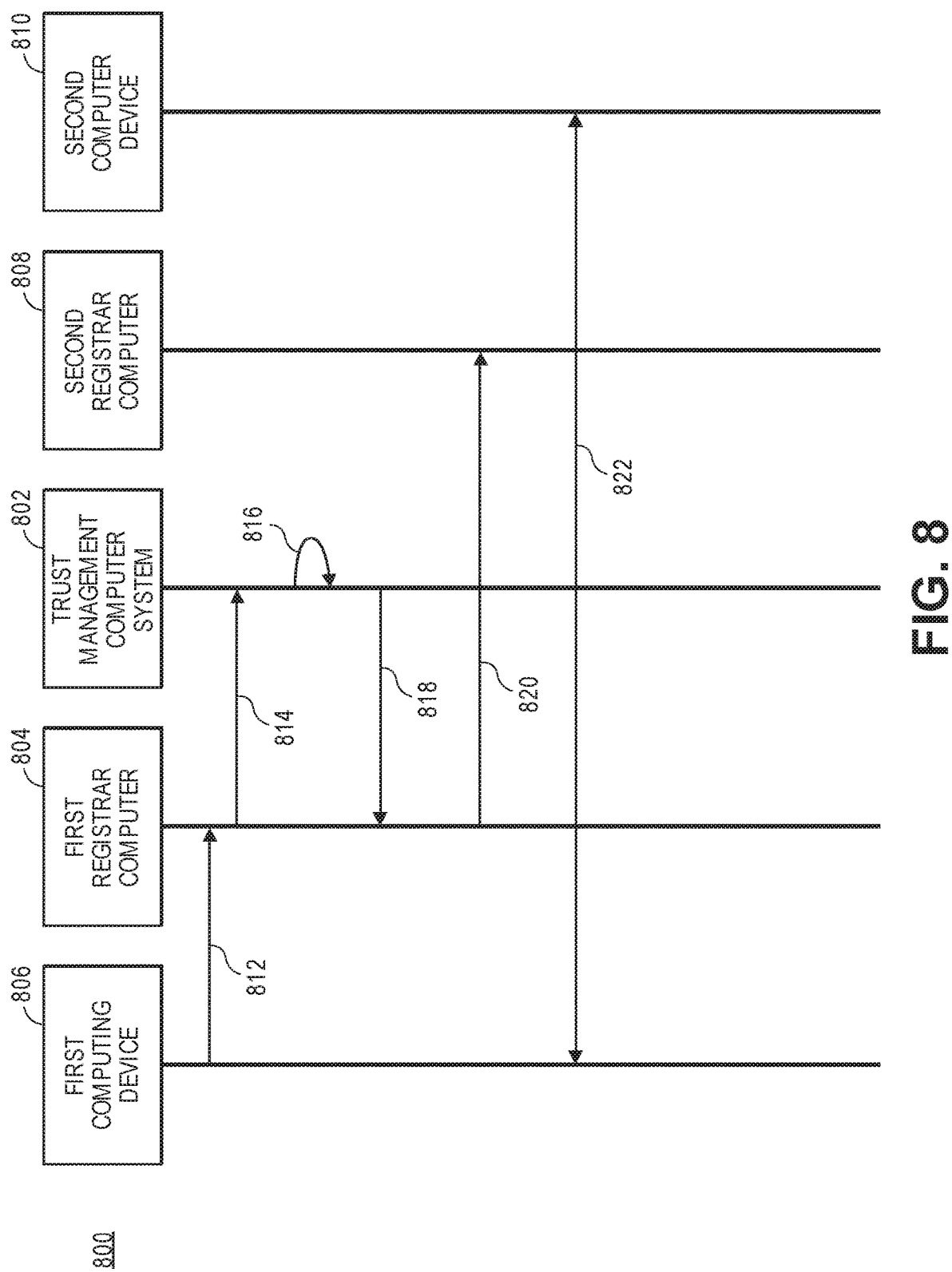
FIG. 8 depicts a diagram illustrating an example technique for authenticating a federated network of computing devices in an open trust network and establishing a connection between devices residing in different federated networks of computing devices according to embodiments of the current disclosure.

FIG. 8 depicts a diagram illustrating an example technique for authenticating a federated network of computing devices in an open trust network and establishing a connection between devices residing in different federated networks of computing devices according to embodiments of the current disclosure. The order in which the operations are described is not intended to be construed as a limitation, and any number of the described operations can be omitted or combined in any order and/or in parallel to implement this process and any other processes described herein.

Some or all of the process 800 (or any other processes described herein, or variations and/or combinations thereof) may be performed under the control of one or more computer systems configured with executable instructions and may be implemented as code (e.g., executable instructions, one or more computer programs, or one or more applications). In accordance with at least one embodiment, the process 800 of FIG. 8 may be performed by at least the one or more computer systems including trust management system 102, processing network registrar 106, first registrar 126, IoT devices 110-114, second registrar 128, and IoT devices 116-120 (FIG. 1). The code may be stored on a computer-readable storage medium, for example, in the form of a computer program including a plurality of instructions executable by one or more processors. The computer-readable storage medium may be non-transitory. The trust management computer system 802, first registrar computer 804, first computing device 806, second registrar computer 808 and second computer device 810 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The process 800 may include receiving, by a first registrar computer 804, a communication request from a first computing device 806 at 812. The communication request from the first computing device 806 may be attempting to trust and communicate with second computing device 810. The process 800 may include first registrar computer 804 requesting whether second computing device 810 is a trusted member of the open trust network and the location information for the second registrar computer 808 from the trust management system computer 802. The determination of trust between members may be processed by the trust management system computer 802 by conducting a vote of all members in the open trust network as described herein (including first registrar computer 804). The process 800 may include the trust management system computer 802 conducting the vote to determine the establishment of trust between the first registrar computer 804 and second registrar computer 808 at 816.

The process 800 may include the trust management system computer 802 indicating to the first registrar computer 804 that the second registrar computer 808 is a trusted member of the open trust network at 818. In embodiments, such an indication may include providing a digitally signed token or other piece of data that includes the location information for the second registrar computer 808 and second computing device 810. The process 800 may include the first registrar computer 804 establishing communication with the second registrar computer 808 at 820. In embodiments, the first registrar computer 804 may generate and provide a token with location information for the first computing device 806 or associated applications/API services to second registrar computer 808 to establish communication between different federated networks of computing devices. As described herein, the token may contain the canonical address for properly locating the second computer device and an associated application/API according to the canonical address format proliferated by the trust management system and maintained by each registrar computer 804 and 808. The process 800 may conclude at 822 by establishing a secure connection between the first computer device 806 and the second computer device 810 utilizing the provided token.

In embodiments where transactions are conducted upon establishing trust and a secure connection, the flow of FIG. 8 may include a transaction processing computer which may be disposed between a transport computer and an issuer computer (not shown). The transaction processing computer may include data processing subsystems, networks, and operations used to support and deliver authorization services, exception file services, and clearing and settlement services. For example, the transaction processing computer may comprise a server coupled to a network interface (e.g., by an external communication interface), and databases of information. The process 800 may include the transport computer requesting authorization of the transaction via the transaction processing computer. The process 800 may include the transaction processing computer providing an authorization response message to a resource provider computer (not shown). In some embodiments, the resource provider computer may proceed with completing the transaction upon receiving the authorization response message.

In some embodiments, the issuer computer may issue and manage a payment account and an associated payment device of a user. The issuer computer may be able authorize transactions that involve the payment account. Before authorizing a transaction, the issuer computer may authenticate payment credentials received in the authorization request, and check that there is available credit or funds in an associated payment account. The issuer computer may also receive and/or determine a risk level associated with the transaction, and may weigh the risk when deciding whether or not to authorize the transaction. If the issuer computer receives an authorization request that includes a payment token, the issuer computer may be able to de-tokenize the payment token in order to obtain the associated payment credentials.

As described herein, a computer system may be used to implement any of the entities or components described above. The subsystems of a computer system may be interconnected via a system bus. Additional subsystems such as a printer, keyboard, fixed disk (or other memory comprising computer readable media), monitor, which is coupled to display adapter, and others are also included in embodiments described herein. Peripherals and input/output (I/O) devices, which may be coupled to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk of the computer system may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:
receiving, by a server computer and from a first registrar computer system in a first federated network of computing devices, a request to authenticate a first computing device being utilized to conduct a transaction in the first federated network of computing devices, the request including a token signed by an entity residing in a second federated network of computing devices, the token including biometric information of a user for the transaction;
identifying, by the server computer, a canonical address for communicating with a second registrar computer system associated with the entity;
transmitting, by the server computer, the authentication request from the first registrar computer system to the second registrar computer system using the canonical address;
receiving, by the server computer and from the second registrar computer system, a confirmation of the authentication request, the confirmation determined by the second registrar computer system based in part on the biometric information of the user and the signature of the token by the entity, and a plurality of policies maintained by the first registrar computer system, the plurality of policies identifying a number of signatures from one or more members of an open trust network for authenticating the request and that a member of the one or more members providing a signature of the signatures is associated with an electronic identification that corresponds a weighted value for the signature; and
transmitting, by the server computer and to the first registrar computer system, the confirmation of the authentication request including the token, the token signed by the first registrar computer system and provided to the first computing device for use in subsequent transactions in the first federated network of computing devices.

2. The computer-implemented method of claim 1, wherein the canonical address represents an overlay address for a hierarchy of addresses associated with the first federated network of computing devices.

3. The computer-implemented method of claim 1, wherein the second registrar computer system maintains template biometric information for verifying the biometric information of the user.

4. The computer-implemented method of claim 1, wherein the server computer, the first registrar computer system, and the second registrar computer system are members of the open trust network.

5. A computer-implemented method, comprising:
receiving, by a registrar computer system associated with a federated network of computing devices, a first request to utilize a shared resource implemented by the federated network of computing devices, the first request provided by a first computing device and including a token associated with the first computing device;
identifying, by the registrar computer system, that the first computing device is an unknown entity based at least in part on the token and one or more signatures used to sign the token and a policy associated with the one or more signatures specified by the registrar computer system, the policy identifying a number of signatures of the one or more signatures from one or more members of an open trust network to authenticate the first request, and that a member of the one or more members providing a signature of the one or more signatures is associated with an electronic identifier that corresponds to a weighted value for the signature;
transmitting, by the registrar computer system to a trust management system, a second request to authenticate the first computing device, the second request including the token;
receiving, by the registrar computer system from the trust management system, an authentication message that verifies the first computing device within the open trust network, the authentication message generated by the trust management system in response to the trust management system communicating with a plurality of registrar computers in the open trust network to determine signatures of the one or more signatures provided by the plurality of registrar computers for the token that represent previous transactions with the first computing device and the token in respective federated networks of computing devices that correspond to the plurality of registrar computers; and
enabling, by the registrar computer to the first computing device, access to the shared resource by at least providing the token and location information for the shared resource to the first computing device, the token signed by the registrar computer and the location information including a canonical address for communicating with the shared resource.

6. The computer-implemented method of claim 5, wherein the shared resource comprises one or more of a mobile computing device, a wearable device, a laptop computer, a desktop computer, a server computer, an automobile, a printer, a scanner, a wireless router, a wireless network, a software application, a storage device, or a computer resource made available by a host.

7. The computer-implemented method of claim 5, further comprising updating, by the trust management system, a mapping of known entities for the registrar computer system in response to enabling access to the shared resource by the registrar computer.

8. The computer-implemented method of claim 5, further comprising receiving, by the registrar computer system from another registrar computer system, an indication that a prior authentication has been performed within another federated network of computing devices associated with the other registrar computer system, the prior authentication performed by the first computing device using biometric information.

9. The computer-implemented method of claim 5, wherein the signatures provided by the plurality of registrar computers for the token are signed using respective private keys that are generated and maintained by the plurality of registrar computers.

10. The computer-implemented method of claim 5, wherein the federated network of computing devices represents a federated block chain.

11. The computer-implemented method of claim 5, wherein the token associated with the first computing device is generated using a hashing algorithm that utilizes biometric information and a private key maintained by a corresponding network of computing devices associated with the first computing device.

12. The computer-implemented method of claim 5, wherein the signatures provided by the plurality of registrar computers for the token represent successfully authenticated transactions within the respective federated networks of computing devices utilizing the first computing device and the token.

13. A server computer, comprising:
    a processor; and
    a memory including instructions that, when executed with the processor, cause the server computer to, at least:
    receive, by the processor from a merchant registrar computer system in a first federated network of computing devices, a request to authenticate a first computing device being utilized to conduct a transaction in the first federated network of computing devices, the request including a token signed by a member of an open trust network residing in a second federated network of computing devices, the token including biometric information of a user for the transaction;
    identify, by the server computer, a canonical address for communicating with a registrar computer system associated with the second federated network of computing devices;
    transmit, by the server computer, the authentication request from the merchant registrar computer system to the registrar computer system using the canonical address;
    receive, by the server computer and from the registrar computer system, a confirmation of the authentication request, the confirmation determined by the registrar computer system using the biometric information of the user and the signature of the token, and a plurality of policies maintained by the registrar computer system, the plurality of policies identifying a number of signatures from one or more members of the open trust network and that the member of the one or more members providing a signature of the signatures is associated with an electronic identification that corresponds to a weighted value for the signature; and
    transmit, by the server computer and to the merchant registrar computer, the confirmation of the authentication request including the token, the token signed by the merchant registrar computer system for transmission to the first computing device for use in subsequent transactions in the first federated network of computing devices.

14. The server computer of claim 13, wherein the member of the open trust network is a banking entity associated with a banking entity computer system, the banking entity computer system configured to capture behavior information and environment information for transactions conducted by the user.

15. The server computer of claim 14, wherein the banking entity computer system is further configured to generate one or more identity profiles based in part on the behavior information and the environment information, the one or more identity profiles associated with the user.

16. The server computer of claim 15, wherein the banking entity computer system is further configured to generate a plurality of tokens, each token of the plurality of tokens corresponding to a token type and based in part on a particular identity profile of the one or more identity profiles associated with the user.

17. The server computer of claim 16, wherein the registrar computer system confirming the authentication request is based at least in part on the token type associated with the token and the signature of the token.

18. The server computer of claim 16, wherein a policy of the plurality of policies includes identifying the token type to authenticate based on a type of transaction.

* * * * *